US012597639B2

(12) United States Patent
    Mokrini et al.

(10) Patent No.:     US 12,597,639 B2
(45) Date of Patent:          Apr. 7, 2026

(54) SOLID POLYMER ELECTROLYTE FOR BATTERIES

(71) Applicant: National Research Council of Canada, Ottawa (CA)

(72) Inventors: Asmae Mokrini, Montreal (CA); Alexis Laforgue, Montreal (CA)

(73) Assignee: National Research Council of Canada

( * ) Notice: Subject to any disclaimer, the term of this patent is extended or adjusted under 35 U.S.C. 154(b) by 654 days.

(21) Appl. No.: 16/621,721

(22) PCT Filed: Mar. 9, 2018

(86) PCT No.: PCT/IB2018/051557
    § 371 (c)(1),
    (2) Date: Dec. 12, 2019

(87) PCT Pub. No.: WO2018/229560
    PCT Pub. Date: Dec. 20, 2018

(65) Prior Publication Data
    US 2021/0143475 A1      May 13, 2021

Related U.S. Application Data

(60) Provisional application No. 62/521,019, filed on Jun. 16, 2017.

(51) Int. Cl.
    *H01M 10/0565*      (2010.01)
    *H01M 4/38*          (2006.01)
    *H01M 10/052*        (2010.01)
    *H01M 4/02*          (2006.01)

(52) U.S. Cl.
    CPC ....... *H01M 10/0565* (2013.01); *H01M 4/382* (2013.01); *H01M 10/052* (2013.01); *H01M 2004/027* (2013.01); *H01M 2300/0082* (2013.01)

(58) Field of Classification Search
    None
    See application file for complete search history.

(56) References Cited

U.S. PATENT DOCUMENTS

| | | | |
|---|---|---|---|
| 5,538,811 A | 7/1996 | Kanbara et al. | |
| 5,874,184 A | 2/1999 | Takeuchi et al. | |
| 6,316,563 B2 | 11/2001 | Naijo et al. | |
| 6,509,122 B1 | 1/2003 | Oyama | |
| 6,855,788 B2 | 2/2005 | Harvey et al. | |
| 7,033,706 B2 | 4/2006 | Mori et al. | |
| 7,678,860 B2 | 3/2010 | Muramoto et al. | |
| 8,445,140 B2 | 5/2013 | Bertin et al. | |
| 2001/0011119 A1 | 8/2001 | Naijo et al. | |
| 2005/0287441 A1 | 12/2005 | Passerini et al. | |
| 2008/0221315 A1 | 9/2008 | Garibotti et al. | |
| 2008/0221353 A1 | 9/2008 | Tsunashima | |
| 2009/0053597 A1 | 2/2009 | Tsunashima et al. | |

| | | | |
|---|---|---|---|
| 2010/0099031 A1* | 4/2010 | Kato | H01M 4/583 429/345 |
| 2010/0118598 A1* | 5/2010 | Hawkins | H01G 9/2013 365/151 |
| 2010/0273063 A1 | 10/2010 | Wallace et al. | |
| 2011/0053034 A1* | 3/2011 | Mitsui | C07F 9/5442 429/324 |
| 2011/0311865 A1 | 12/2011 | Tatsumi et al. | |
| 2016/0226096 A1* | 8/2016 | Tsujiko | H01M 4/131 |
| 2017/0018800 A1* | 1/2017 | Choi | C09D 125/18 |
| 2017/0125868 A1* | 5/2017 | Kim | H01M 10/0565 |

FOREIGN PATENT DOCUMENTS

| | | |
|---|---|---|
| CA | 2427082 A1 | 4/2003 |
| JP | H1021962 A | 1/1998 |
| JP | H11147989 A | 6/1999 |
| JP | H11162514 A | 6/1999 |
| JP | 2003157719 A | 5/2003 |
| JP | 2006049122 A | 2/2006 |
| JP | 2013182783 A | 9/2013 |
| JP | 2013196878 A | 9/2013 |
| JP | 2015069967 | 4/2015 |
| JP | 2017510961 A | 4/2017 |
| KR | 20100041768 | 4/2010 |
| KR | 20170009653 | 1/2017 |
| KR | 2017-0052388 | 5/2017 |
| KR | 101729121 B1 | 5/2017 |
| WO | 0235636 A1 | 5/2002 |
| WO | 2008022983 A3 | 2/2008 |
| WO | 2010009083 A1 | 1/2010 |
| WO | 2014006333 A1 | 1/2014 |
| WO | 2015117189 A1 | 8/2015 |

OTHER PUBLICATIONS

Extended European Search Report dated Jan. 26, 2021.
M. Armand, et al, Conjugated Dicarboxylate Anodes for Li-ion Batteries, 2009.
Zheng Wang et al, A Dynamic Longitudinal Examination of Social Media Use, Needs, and Gratifications Among College Students (not sure if this is the right prior art?) 2012.
Morten Wetjen et al, Temperature Dependence of Electrochemcial Properties of Cross-linked Poly(ethylene oxide)-Lithium Bis (trifluoromethanesulfonyl) Imide-N-Butyl-N-Methylpyrrolidinium bis (trifluoromethanesulfonyl) Imide Solid Polymer Electrolytes for Lithium Batteries 2013.
Rotem Marom et al, A Review of Advanced and Practical Lithium Battery Materials 2011.
International Search Report and Written Opinion dated Jun. 18, 2018.
A.M.A. Dias et al, Phosphonium Ionic Liquids as Greener Electrolytes for Poly(Vinyl Chloride)-Based Ionic Conducting Polymers 2016.

(Continued)

*Primary Examiner* — Jeremiah R Smith
(74) *Attorney, Agent, or Firm* — Brett Reynolds

(57)          ABSTRACT

Provided is a solid polymer electrolyte (SPE) comprising a dissociable metal salt; a metal ion conductive polymer system; and a phosphonium salt having the general formula $[PR_1R_2R_3R_4]X$, where each of $R_1$, $R_2$, $R_3$ and $R_4$ are independently selected from $C_1$ to $C_{12}$ hydrocarbons, which hydrocarbons may be optionally substituted by 1 to 5 heteroatoms selected from N, O, and S, and X is an anion. Further provided are a method for preparing the solid polymer electrolyte and an electrochemical cell comprising the solid polymer electrolyte.

21 Claims, 13 Drawing Sheets

(56) References Cited

OTHER PUBLICATIONS

E. de Vries et al, Predictions of Skin Cancer Incidence in the Netherlands up to 2015, 2005.

Hyeon-Gyu Shin et al, Evidence for Sequential Ion-Binding Loci Along the Inner Pore of the IRK1 Inward-Rectified K+ Channel 2005.

Gupta et al 2016.

Robati et al, Removal of hazardous dyes-BR 12 and methyl orange using graphene oxide as an adsorbent from aqueous phase, Chemical Engineering Journal, 2016.

Yue et al, All solid-statepolymerelectrolytesforhigh-performancelithiumion batteries, Energy Storage Materials, 2016.

Tsunashima et al, Influence of Nonflammable Diluents on Properties of Phosphonium Ionic Liquids as Lithium Battery Electrolytes, ECS Transactions, 2012.

Tsurumaki et al, Properties of polymer electrolytes composed of poly(ethylene oxide) and ionic liquids according to hard and soft acids and bases theory, Polymer Advanced Technologies, 2011.

EP Office Action dated Feb. 5, 2020.

Office Action for Japanese appl. No. 2019-569477 dated Feb. 21, 2022.

Korean Office Action dated Feb. 24, 2023.

* cited by examiner (a)

SOLID POLYMER ELECTROLYTE FOR BATTERIES

FIELD OF THE INVENTION

The present invention relates generally to the field of batteries, and more particularly to the field of solid polymer electrolytes (SPEs) for use in electrochemical cells.

BACKGROUND

Typically, solid polymer electrolytes for use in batteries are based on a polymer capable of solvating metal salts and a metal salt, such as a lithium salt or a sodium salt. As a battery is discharged to produce electrons, the solid polymer electrolyte provides a transport medium for ions between the electrodes and also provides a physical and electrical isolation to avoid electrical contact between the electrodes.

High performance all-solid polymer electrolytes are safer and much sought to replace the flammable and volatile liquid electrolytes currently used in many battery systems. However, the room temperature conductivity of batteries with solid polymer electrolytes is relatively low and they require a higher operation temperature to achieve desired conductivities and energy densities, particularly for automotive applications where high conductivity and energy density are required.

Ionic liquids (ILs) are room-temperature molten salts, composed mostly of organic ions that may undergo almost unlimited structural variations. The current interest in ionic liquids is motivated by their unique properties, such as negligible vapor pressure, thermal stability and non-flammability, combined with high ionic conductivity and wide electrochemical stability window. Some ionic liquids have an electrochemical window of up to 6 V, supporting more energy-dense metals (Armand et al. Nature Materials, 2009 8(8), 621-629). The incorporation of various ionic liquids into solid polymer electrolytes is being investigated as a way to improve the performance of batteries comprising solid polymer electrolytes.

Examples of studies investigating the preparation of solid polymer electrolytes comprising nitrogen-based ionic liquids include US 2005/0287441 and WO 2014/006333. Phosphonium-based ionic liquids have also been considered for use as liquid electrolytes in batteries and supercapacitors, for example see Tsunashima et al., ECS Transactions, 2012, 419; US2008221315; TW200926481; WO2010/009083; and US2011/0311865. Tsurumaki et al, in Poly.Adv.Technol. 2011, 1223 investigated the miscibility of 12 different ionic liquids with low molecular weight poly(ethylene oxide) ($PEO_{4000}$), in order to assess whether the tested ionic liquids might be suitable for use with PEO. While no solid polymer electrolytes were prepared in this study, the solubility of PEO in the different ionic liquids was investigated. Nitrogen-based ionic liquids were found to be compatible with PEO, while the phosphonium-based ionic liquid that was tested, tributyl-n-octylphosphonium bromide ([P4448]Br), was found to be incompatible with PEO and was discarded for the rest of the study.

Gupta et al, in RSC Adv., 2016, 6, 87878, prepared and characterized a solid polymer electrolyte comprising polyethylene oxide (PEO) and the phosphonium-based ionic liquid trihexyltetradecylphosphonium bis(trifluoromethanesulfonyl)imide. The thermal stability and ionic conductivity of this solid polymer electrolyte were characterized, but its performance characteristics in an electrochemical cell were not reported, therefore it is unknown whether there is any benefit of this solid polymer electrolyte system over other ionic liquid-containing solid polymer electrolyte systems.

SUMMARY

Provided generally is a solid polymer electrolyte (SPE) comprising a dissociable metal salt; a metal ion conductive polymer system; and a phosphonium salt (ionic liquid), where the phosphonium salt has the general formula $[PR_1R_2R_3R_4]X$, as defined below. Further provided are a method for preparing the solid polymer electrolyte and an electrochemical cell comprising the solid polymer electrolyte.

A first embodiment is a solid polymer electrolyte comprising a dissociable metal salt; a metal ion conductive polymer system; and a phosphonium salt, wherein the dissociable metal salt is soluble in the metal ion conductive polymer system and the phosphonium salt; the phosphonium salt has the general formula $[PR_1R_2R_3R_4]X$, where each of $R_1$, $R_2$, $R_3$, and $R_4$ are independently selected from $C_1$ to $C_{12}$ hydrocarbons, which hydrocarbons may be optionally substituted by 1 to 5 heteroatoms selected from N, O, and S, and X is an anion; the phosphonium salt has a melting point below 100° C.; and the solid polymer electrolyte is solid at a temperature of 20° C.

In an embodiment, an admixture of the dissociable metal salt and the metal ion conductive polymer system, absent the phosphonium salt, has a conductivity of from $10^{-5}$ S/cm to $10^{-6}$ S/cm.

In an embodiment the dissociable metal salt is an alkali metal salt, an aluminum salt, or a magnesium salt. In a further embodiment, the dissociable metal salt is a lithium salt or a sodium salt. In a still further embodiment, the dissociable metal salt is a lithium salt comprising lithium bis(trifluoromethanesulfonyl)imide (LiTFSI), lithium bis (fluorosulfonyl)imide (LiFSI), lithium bis-(perfluoroethylsulfonyl)imide (LiBETI), lithium trifluoromethanesulfonate ($LiCF_3SO_3$), lithium hexafluorophosphate ($LiPF_6$), lithium hexafluoroborate ($LiBF_4$), lithium perchlorate ($LiClO_4$), lithium bis(oxalato)borate (LiBOB), or a mixture of two or more thereof. In an embodiment, the lithium salt comprises LiTFSI.

In an embodiment, the metal ion conductive polymer system comprises a single polymer or copolymer, which is optionally crosslinked.

In another embodiment, the metal ion conductive polymer system comprises two or more of a polymer, a copolymer, or a combination thereof. In an embodiment, at least one of the polymer and/or copolymer is crosslinked.

In an embodiment, the metal ion conductive polymer system comprises polyethylene oxide, polypropylene oxide, polybutylene oxide, a polymer bearing perfluorosulfonic acid functionalities, a polymer bearing trifluoromethanesulfonylimide functionalities, a copolymer of one or more thereof, or a mixture of two or more thereof. In a further embodiment, the metal ion conductive polymer system comprises polyethylene oxide or a copolymer thereof.

In a further embodiment of the solid polymer electrolyte, the metal ion conductive polymer system further comprises polyvinylidene fluoride (PVDF), poly(methyl methacrylate) (PMMA), nitrile butadiene rubber (NBR), polyvinylidene fluoride-co-trifluoroethylene (PVDF-TrFE), polytetrafluoroethylene (PTFE), or a combination of two or more thereof.

In a still further embodiment of the solid polymer electrolyte, the metal ion conductive polymer system further comprises an additive that lowers the crystallinity of one or more polymers or copolymers comprised in the metal ion conductive polymer system. In an embodiment the additive is a copolymer formed from a comonomer. In a further embodiment, the comonomer that forms the copolymer is hexafluoropropylene (HFP).

In an embodiment of the solid polymer electrolyte, the metal ion conductive polymer system comprises a polyethylene oxide polymer or copolymer and a PVDF-HFP copolymer. In a further embodiment, the polyethylene oxide polymer or the polyethylene oxide moiety included in the copolymer has a molecular weight of between about $1.0 \times 10^4$ g/mol and about $1.0 \times 10^6$ g/mol.

In an embodiment of the solid polymer electrolyte, the phosphonium salt has a melting point below 80° C. In another embodiment, the phosphonium salt has a melting point below 25° C. In an embodiment, the phosphonium salt is physically stable at a temperature of 160° C.

In an embodiment of the solid polymer electrolyte, the $R_1$, $R_2$, $R_3$ and $R_4$ groups of the phosphonium salt are alkyl groups, each of which may be optionally substituted by 1 to 5 heteroatoms selected from N, O, and S. In another embodiment, $R_1$, $R_2$, and $R_3$ are independently selected from $C_1$ to $C_4$ alkyl groups and $R_4$ is selected from $C_6$ to $C_{12}$ alkyl groups. In yet another embodiment, $R_1$, $R_2$, and $R_3$ are the same alkyl group, selected from $C_1$ to $C_4$ alkyl groups and $R_4$ is selected from $C_6$ to $C_{12}$ alkyl groups. In a still further embodiment, $R_1$ and $R_2$ are the same alkyl group, selected from $C_1$ to $C_4$ alkyl groups and $R_3$ and $R_4$ are the same alkyl group, selected from $C_6$ to $C_{12}$ alkyl groups. In another embodiment, $R_1$, $R_2$, and $R_3$ are the same alkyl group, selected from $C_2$ to $C_4$ alkyl groups, and $R_4$ is a $C_8$ alkyl group. In a further embodiment, the phosphonium salt comprises triethyloctylphosphonium, tri-n-butyloctylphosphonium, tri-n-butylmethylphosphonium, or a mixture of two or more thereof. In another embodiment, the phosphonium salt comprises triethyloctylphosphonium.

In an embodiment, the solid polymer electrolyte comprises the phosphonium salt in an amount of from about 5 wt % to about 50 wt %. In a further embodiment, the solid polymer electrolyte comprises the phosphonium salt in an amount of from about 15 wt % to about 50 wt %. In another embodiment, the solid polymer electrolyte comprises the phosphonium salt in an amount of from about 15 wt % to about 25 wt %. In yet another embodiment, the solid polymer electrolyte comprises from about 5 mol % to about 25 mol % of the dissociable metal salt. In an embodiment, the solid polymer electrolyte comprises about 10 mol % of the dissociable metal salt.

In an embodiment, the solid polymer electrolyte is in the form of a film. In an embodiment, the film has a thickness of from about 5 μm to about 500 μm. In another embodiment, the film has a thickness of from about 10 μm to about 100 μm.

In an embodiment, the solid polymer electrolyte is solid at a temperature of 80° C.

In a further embodiment, the solid polymer electrolyte comprises a radical polymerization initiator. In an embodiment, the radical polymerization initiator comprises pentaerythritol triacrylate, dialkyl peroxide, benzophenone, (4-benzoylbenzyl) trimethylammonium chloride, or a combination of two or more thereof. In a further embodiment, the radical polymerization initiator comprises benzophenone.

Another embodiment is a method for preparing a solid polymer electrolyte, the method comprising: providing a mixture comprising a metal ion conductive polymer system, a phosphonium salt, and a dissociable metal salt; and forming the mixture into a body, wherein the metal ion conductive polymer system and the phosphonium salt solubilize the dissociable metal salt; the phosphonium salt has the general formula $[PR_1R_2R_3R_4]X$, where each of $R_1$, $R_2$, $R_3$ and $R_4$ are independently selected from $C_1$ to $C_{12}$ hydrocarbons, which hydrocarbons may be optionally substituted by 1 to 5 heteroatoms selected from N, O, and S, and X is an anion; the phosphonium salt has a melting point below 100° C.; and the solid polymer electrolyte is solid at a temperature of 20° C.

In an embodiment of the method, the metal ion conductive polymer system is a crosslinkable metal ion conductive polymer system and the method further comprises a step of crosslinking the metal ion conductive polymer system after forming the mixture into the body. In a further embodiment, the mixture comprises a polymerization initiator. In a further embodiment, the polymerization initiator is a radical polymerization initiator. In an embodiment, the polymerization initiator is a radical polymerization initiator. In an embodiment, the radical polymerization initiator comprises pentaerythritol triacrylate, dialkyl peroxide, benzophenone, (4-benzoylbenzyl) trimethylammonium chloride, or a combination thereof. In a still further embodiment, the radical polymerization initiator comprises benzophenone.

In a still further embodiment, the mixture comprises the polymerization initiator in an amount of from 2 wt % to 4 wt %.

In an embodiment of the method, the crosslinkable metal ion conductive polymer system comprises a polymer having a chemical group that can initiate radical polymerization.

In an embodiment of the method, prior to forming the mixture into the body, the mixture is at a temperature above the melting temperature of the metal ion conductive polymer system.

In an embodiment of the method, the forming of the mixture into the body is carried out by melt extrusion. In a further embodiment, the forming of the mixture is carried out by admixing the metal ion conductive polymer system, the phosphonium salt, and the dissociable metal salt at a temperature below the melting temperature of the phosphonium salt. In a still further embodiment, the admixing is carried out at a temperature between about −210° C. and −50° C.

In an embodiment of the method, the forming of the mixture is carried out by admixing the metal ion conductive polymer system, and the dissociable metal salt, to form a solid mixture, and then adding the phosphonium salt to the solid mixture at a temperature above the melting temperature of the phosphonium salt.

In an embodiment of the method, the body is melt extruded onto a backing layer.

In another embodiment of the method, the body is melt extruded onto an electrode.

In yet another embodiment of the method, the mixture is formed into the body by solvent casting.

In a further embodiment of the method, the step of crosslinking the crosslinkable conductive polymer comprises exposing the body to a UV source, exposing the body to an infrared source, or heating the body. In a further embodiment, the step of crosslinking the crosslinkable conductive polymer comprises exposing the body to a UV source.

In an embodiment of the method, the body is a film. In a further embodiment, the film has a thickness of from about 5 μm to about 500 μm. In another embodiment, the film has a thickness of from about 10 μm to about 100 μm.

In an embodiment of the method, the solid polymer electrolyte, the metal ion conductive polymer system, the phosphonium salt, and the dissociable metal salt are as defined in the embodiments described above.

Another embodiment is an electrochemical cell comprising a solid polymer electrolyte as described above or produced by a method as described above. In an embodiment, the electrochemical cell comprises a metallic lithium anode.

BRIEF DESCRIPTION OF DRAWINGS

Exemplary embodiments of the invention will now be shown in conjunction with the drawings in which:

FIGS. 1a, 1b, and 1c show the structures of three exemplary phosphonium-based salts (ionic liquids); triethyloctyl-phosphonium bis(trifluoromethanesulfonyl)imide , tri-n-butyloctyl-phosphonium bis(trifluoromethanesulfonyl)imide, and tri-n-butylmethyl-phosphonium bis(trifluoromethanesulfonyl)imide having the general structure $[R_1R_2R_3R_4P]X$ where $R_1$, $R_2$, and $R_3$ are C2 or C4 alkyl groups, $R_4$ is a C8 alkyl group, and X is the anion bis(trifluoromethanesulfonyl)imide (TFSI).

DETAILED DESCRIPTION

Figure 2:
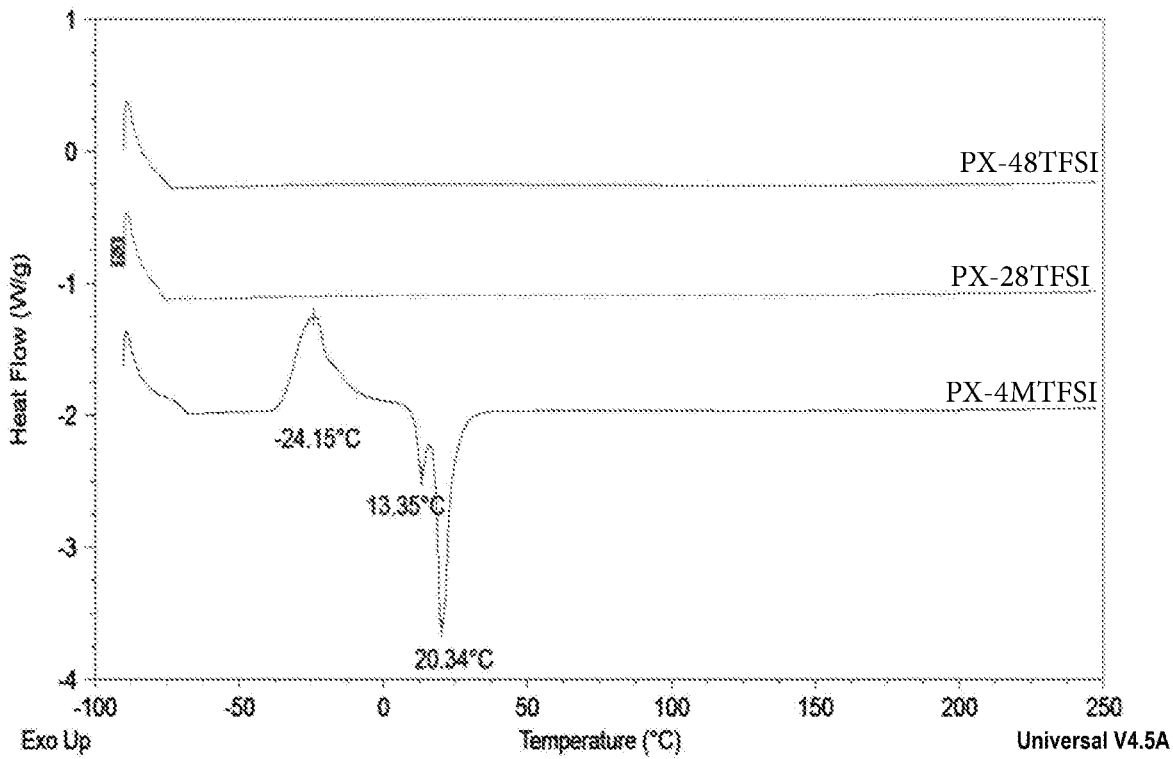
FIG. 2 depicts differential scanning calorimetry of the phosphonium-based ionic liquids depicted in FIG. 1.

The use of the terms "a" and "an" and "the" and similar referents in the context of describing the invention (especially in the context of the following claims) are to be construed to cover both the singular and the plural, unless otherwise indicated herein or clearly contradicted by context.

The terms "comprising", "having", "including", and "containing" are to be construed as open-ended terms (i.e., meaning "including, but not limited to") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

All methods described herein can be performed in any suitable order unless otherwise indicated herein or otherwise clearly contradicted by context.

The use of any and all examples, or exemplary language (e.g., "such as" and "for example") provided herein, are intended merely to better illustrate the invention and do not pose a limitation on the scope of the invention unless otherwise claimed.

Herein, the term "about" has its ordinary meaning. The term "about" is used to indicate that a value includes an inherent variation of error for the device or the method being employed to determine the value, or encompass values close to the recited values, for example within 10% or 5% of the recited values (or range of values).

Unless defined otherwise, all technical and scientific terms used herein have the same meaning as commonly understood to one of ordinary skill in the art to which this invention belongs.

Batteries with solid polymer electrolytes require a higher operation temperature, relative to batteries with liquid electrolytes, to achieve desired conductivities and energy densities, particularly for automotive applications, but also for other applications, such as storage for solar or wind-derived energy and energy banks for remote areas. If this operation temperature could be reduced, then a battery with a solid polymer electrolyte could devote less energy to the heating of the battery itself, or ideally be maintained at a useful operation temperature by the heat generated by the battery itself. This would simplify the battery pack design by minimizing external heating systems and recovering part of the battery capacity used for heating purposes and making it available to the user, contributing to an increase in driving range and overall cost reduction when used in automotive applications. In addition to the costs related to high temperature system operation, metal dendrite formation is a problem for current electric vehicle batteries at high operation temperatures, especially when metallic lithium is used as an anode material. It would be beneficial to have a solid polymer electrolyte for rechargeable batteries that is capable of operating safely over a wide temperature range with the required energy density, while preventing short-circuits due to dendrite growth.

It is believed that the use of selected ionic liquids as additives to solid polymer electrolytes may improve the ionic conductivity of the solid polymer electrolyte and extend the low temperature operation range of solid polymer electrolyte-based batteries. The chemistry of the ionic liquid has an impact on the solid electrolyte/electrode interface and must be considered carefully to achieve acceptable stability upon cell operation. For example, one may consider the electrochemical stability of the ionic liquid at highly electro-reductive potentials and at electro-oxidative potentials. Depending on its chemistry, the ionic liquid might have multiple benefits. The ionic liquid may decrease the crystallinity of the conductive polymer system, therefore increasing the metal ion mobility within the said conductive polymer. The ionic liquid may provide an additional mobility vector for the metal ion, therefore increasing the metal ion mobility in the conductive polymer system. This is particularly of interest in conditions when the chain mobility of the polymer is reduced, e.g. at lower temperatures. Further, the ionic liquid may improve the interface stability of the conductive polymer system with both electrodes, in particular the negative electrode, and especially when this negative electrode is a metal. Improving the interface stability may help to avoid or limit the initiation and growth of metal dendrites during recharge (metal plating), thereby reducing the chance that a metal dendrite will cause a short in the battery.

The present application provides a solid polymer electrolyte which may be used in a metal-ion electrochemical cell. By "metal-ion electrochemical cell" is meant any electrochemical cell where at least some of the ions that are mobile within the electrolyte are metal ions, irrespective of the nature of the electrodes. Metal ions suitable for use in electrochemical cells will be understood to those skilled in the art and include, for example, alkali metals such as lithium, sodium, and potassium; aluminum; and magnesium. In an embodiment, the metal ion is an alkali metal ion, such as a lithium, sodium, or potassium ion. In another embodiment, the metal ion is a lithium ion. It is believed that the solid polymer electrolyte could confer several advantages in an electrochemical cell, including improved resistance to dendrite formation, improved capacity at high power, and improved capacity at relatively low operation temperatures.

Metal ion Conductive Polymer System

One component of the solid polymer electrolyte is a metal-ion-conductive polymer system, also referred to herein as the polymer system. The components of the polymer system are selected such that (a) the polymer system is able to solubilize and conduct metal ions, both features being together referred to herein as metal ion conductivity, and (b) that the solid polymer electrolyte as a whole, comprising the polymer system, metal salt and phosphonium salt, remains solid at a temperature of at least $20°$ C. This ability to provide for a solid polymer electrolyte that is solid at a temperature of at least $20°$ C. is referred to herein as the ability of the polymer system to impart physical stability to the solid polymer electrolyte.

A variety of metal ion-conductive polymers have been characterized (for example, see Yue et al, Energy Storage Materials 5(2016)139-164). Suitable metal ion-conductive polymers will be understood to one skilled in the art and include polymers such as polyethylene oxide, polypropylene oxide, polybutylene oxide, polycarbonates, polymethylmethacrylates, polysiloxanes, plastic crystals, and based copolymers containing ethylene oxide, propylene oxide, butylene oxide, carbonates, acrylates, siloxane-based moiety as a block or randomly distributed in the main chain, or polymers having any type of backbone bearing the moieties described herein as side chains, and based composites and blends.

In some embodiments, the polymer system is selected such that the solid polymer electrolyte is solid at a temperature of about $20°$ C., about $30°$ C., about $40°$ C., about $50°$ C., about $60°$ C., about $70°$ C., about $80°$ C., about $90°$ C., or about $100°$ C. In one embodiment, the polymer system is selected such that the solid polymer electrolyte is solid at a temperature of about $80°$ C.

In some embodiments, the polymer system is selected such that an admixture of the polymer system, the dissociable metal salt, and the metal ion conductive polymer system, absent the phosphonium salt, has a room-temperature ($23°$ C.) conductivity in the range of $10^{-5}$ S/cm to $10^{-6}$ S/cm.

In some embodiments, the polymer system may comprise a single polymer or a single copolymer that provides metal conductivity and imparts physical stability to the solid polymer electrolyte. In an embodiment, the single polymer or copolymer may be crosslinked to assist in imparting physical stability to the polymer system. The crosslinking may be provided for by chemical groups that make part of the monomeric repeating structure of the polymer or that make part of a comonomer that forms the copolymer. For example, polyethylene oxide may be photo-crosslinked by UV radiation in the presence of a crosslinking agent, such as benzophenone. Suitable crosslinking agents for different polymers, copolymers, and chemical groups will be known to one skilled in the art. In another embodiment, the crosslinking may be provided for by pendent groups attached to the polymer or copolymer. For example, the polymer system may comprise a polyethylene oxide polymer with a substituent containing a reactive function which is cross-linkable by a free radical process, as described in U.S. Pat. No. 6,855,788.

In another embodiment, the polymer system may comprise two or more polymers, copolymers, or combinations thereof, which together provide a polymer system having the required metal ion conductivity and which impart the requisite physical stability to the solid polymer electrolyte.

Metal ion conductivity properties may be imparted by one or more of the two or more polymers and/or copolymers. Polymers that have a low contribution to metal ion conductivity may be included in the polymer system to improve the physical characteristics of the polymer system, for example to impart physical stability.

In one embodiment, the polymer system comprises polyethylene oxide, polypropylene oxide, polybutylene oxide, or mixtures, copolymers, and/or derivatives of one or more thereof, which polymers are able to solubilize metal ions, such as lithium ions, and thus impart metal ion conductivity. In one particular embodiment, the polymer system comprises polyethylene oxide. These and other polymers or copolymers which impart metal ion conductivity may in some embodiments be crosslinked to impart physical stability to the polymer system.

In another embodiment, the polymer system may further comprise an additional polymer such as polyvinylidene fluoride (PVDF), poly(methyl methacrylate) (PMMA), nitrile butadiene rubber (NBR), polyvinylidene fluoride-co-trifluoroethylene (PVDF-TrFE), polytetrafluoroethylene (PTFE), or mixtures, copolymers and/or derivatives of one or more thereof, which additional polymer(s) may impart physical stability to the polymer system. The additional polymer(s) may impart physical stability in crosslinked or non-crosslinked form.

No limit is to be placed on the molecular weight of the polymer(s) or copolymer(s) comprised in the polymer system, so long as the required characteristics recited herein for the polymer system and the solid polymer electrolyte are achieved. In some embodiments, the molecular weight of the one or more polymers or copolymers may be from $1.0×10^4$ g/mol to $1.0×10^6$ g/mol. In one particular embodiment, the polymer system comprises PEO having a molecular weight from about $3.5×10^4$ g/mol to about $1.0×10^6$ g/mol. For example, the PEO may have a molecular weight of about $3.5×10^4$ g/mol, about $2.0×10^5$ g/mol, about $3.0×10^5$ g/mol, about $6.0×10^5$ g/mol, about $1.0×10^6$ g/mol, a molecular weight between any of these values, or a blend of two or more molecular weights within the range of about $3.5×10^4$ g/mol to about $1.0×10^6$ g/mol.

In some embodiments, the polymer system comprises a polymer or copolymer imparting metal ion conductivity to the polymer system and a polymer or copolymer imparting structural stability to the polymer system. The content ratio of the two polymers or copolymers is limited only by the requirements that the polymer system provides ion conductivity throughout a thickness of the solid polymer electrolyte, and that the solid polymer electrolyte has the required structural stability at the selected temperature. In one embodiment, the volume ratio of the polymer or copolymer imparting metal ion conductivity, to the polymer or copolymer providing structural stability, is from about 1:10 to about 10:1, from about 1:2 to about 2:1, or about 1:1.

Polymers having low crystallinity may be desirable for use in the polymer system as they may have increased ion conductivity. In some embodiments, the polymer system may further comprise an additive, which may be a polymer, copolymer, or a filler such as a metal oxide (e.g. $TiO_2$, $SiO_2$, $Al_2O_3$, $ZrO_2$, or CdO) or ceramic (e.g. mesoporous silica or superacid zirconia) that lowers the crystallinity of one or more polymers or copolymers comprised in the polymer system. In an embodiment the additive comprises a copolymer formed from a monomer that lowers the crystallinity of the copolymer. Such a comonomer may be, for example, hexafluoropropylene (HFP).

In some embodiments, the solid polymer electrolyte may also comprise a crosslinking agent to initiate crosslinking of one or more of the polymers or copolymers comprised in the polymer system. Suitable types of polymerization initiators can be selected based on the nature of the cross-linkable groups that are found in the polymers and/or copolymers forming part of the polymer system. The crosslinking agent may be activated by various means known to those skilled in the art, for example by exposing the polymer system or solid polymer electrolyte to a UV source or an infrared source, or by heating the polymer system or solid polymer electrolyte.

In one embodiment, a crosslinking agent is used to initiate radical polymerization within the polymer system. The crosslinking agent may comprise, for example, pentaerythritol triacrylate, dialkyl peroxide, benzophenone, (4-benzoylbenzyl) trimethylammonium chloride, or a combination of two or more thereof.

In another embodiment, a crosslinking agent may be intrinsic within the polymer system, as a pendant group on a polymer within the system, or as a monomeric species that is part of a copolymer comprised in the polymer system.

In some embodiments, the crosslinking agent may be present in the solid polymer electrolyte in an amount of from 1 to 10 wt %, for example from 2 to 4 wt %.

In an embodiment, the solid polymer electrolyte comprises a polymer system comprising a crosslinked polyethylene oxide (PEO) polymer or copolymer and a PVDF polymer or copolymer. In a further embodiment, the PVDF polymer or copolymer is a PVDF-HFP copolymer. In a still further embodiment, the volume ratio of PEO to PVDF (or PVDF-HFP) may be from 1:2 to 2:1, for example about 1:1.

Phosphonium Salt

A component comprised in the solid polymer electrolyte is a phosphonium salt having a melting temperature below 25° C. and having the general formula $[R_1R_2R_3R_4]X$, where each of $R_1$, $R_2$, $R_3$, and $R_4$ are independently selected from C1 to C12 hydrocarbons, which hydrocarbons may be optionally substituted by 1 to 5 heteroatoms selected from N, O, and S, and X is an anion. Suitable anions will be known to one skilled in the art and include, for example, bis(trifluoromethanesulfonyl)imide (TFSI), bis(fluorosulfonyl) imide (FSI), bis-(perfluoroethylsulfonyl)imide (BETI), trifluoromethanesulfonate, hexafluorophosphate, tetrafluoroborate, perchlorate and bis(oxalato)borate (BOB). Such a phosphonium salt may also be referred to as a phosphonium ionic liquid (or P-IL), these terms being used interchangeably herein. In further embodiments, the phosphonium salt has a melting point ebelow 20° C., below 0° C., below –20° C., below –40° C., or below –60° C.

In an embodiment, the phosphonium salt may further be thermally stable at a temperature of about 100° C., about 150° C., about 200° C., about 250° C., about 300° C., or about 350° C. In one particular embodiment, the phosphonium salt is thermally stable at a temperature of 350° C. By thermally stable, it is meant that no more than 3 wt % of the phosphonium salt is decomposed or volatilized when heated to such a temperature during thermogravimetric (TGA) analysis.

In some embodiments, the phosphonium salt is selected such that it is able to solubilize metal ions of a dissociable metal salt comprised in the solid polymer electrolyte. In a further embodiment, the phosphonium salt is selected such that it is able to solubilize lithium ions of a dissociable lithium salt comprised in the solid polymer electrolyte.

Figure 1:
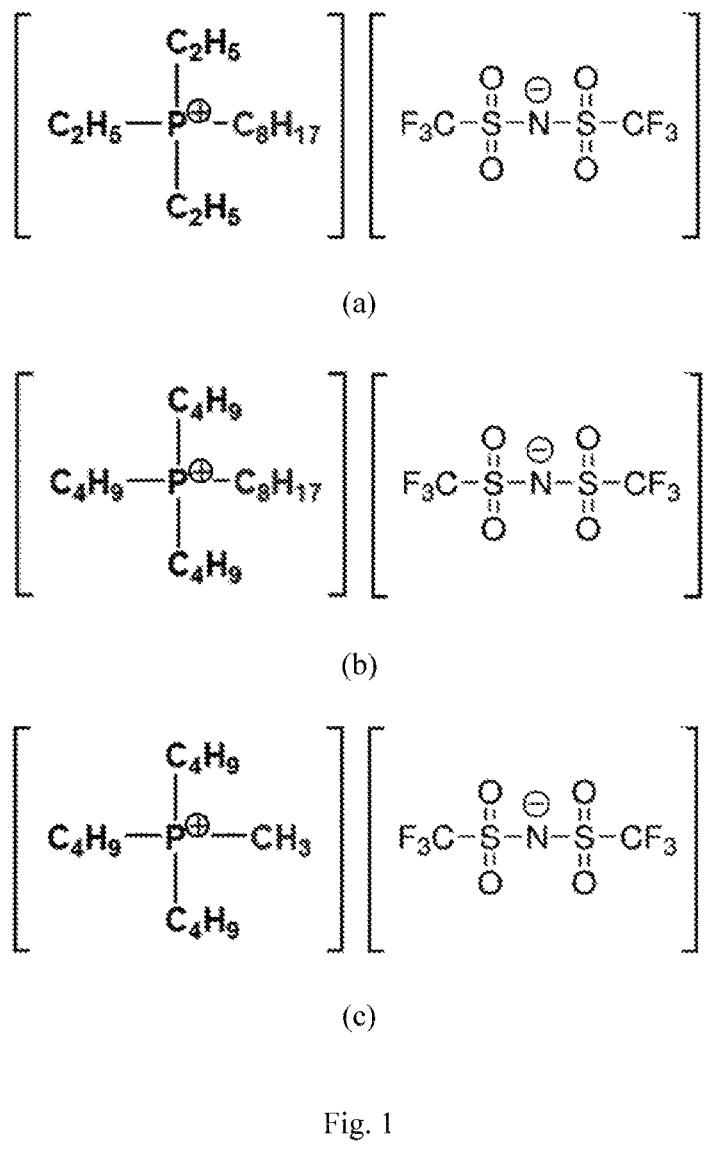

Examples of suitable phosphonium salts include triethyloctylphosphonium, tri-n-butyloctylphosphonium, and tri-n-butylmethylphosphonium. The structures for these P-ILs, with a TFSI anion, are depicted, respectively, in FIGS. 1a, 1b, and 1c.

In some embodiments, the solid polymer electrolyte comprises the phosphonium salt in an amount of from about 5 wt % to about 60 wt %, from about 5 wt % to about 50 wt %, or from about 10 wt % to about 25 wt %.

Metal Salt

The solid polymer electrolyte further comprises a dissociable metal salt, suitable for use in an electrochemical cell, as will be known to one skilled in the art. For example, the metal salt may be an alkali metal salt, an aluminum salt, or a magnesium salt. In an embodiment, the metal salt is an alkali metal salt selected from a lithium salt, a sodium salt, and a potassium salt. In another embodiment, the metal salt is a lithium salt. The metal salt is selected such that it can be at least partially dissolved in the polymer system and in the phosphonium salt that is also comprised in the solid polymer electrolyte.

Suitable lithium salts for use in lithium-ion electrolytic cells will be known to one skilled in the art, and examples include lithium bis(trifluoromethanesulfonyl)imide (LiTFSI), lithium bis(fluorosulfonyl)imide (LiFSI), lithium bis-(perfluoroethylsulfonyl)imide (LiBETI), lithium trifluoromethanesulfonate ($LiCF_3SO_3$), lithium hexafluorophosphate ($LiPF_6$), lithium hexafluoroborate ($LiBF_4$), lithium perchlorate ($LiClO_4$), lithium bis(oxalato)borate (LiBOB) and mixtures of two or more thereof. In a particular embodiment, the dissociable lithium salt comprises LiTFSI.

In some embodiments, the solid polymer electrolyte comprises sufficient dissociable metal salt to provide a solid polymer electrolyte that can conduct metal ions when placed between an anode and a cathode in an electrochemical cell. For example, the solid polymer electrolyte may comprise from about 5 mol. % to about 25 mol. %, or about 10 mol. %, of the dissociable metal salt.

Structure and Characteristics

The solid polymer electrolyte described herein may have any physical shape suitable for use within an electrochemical cell. For example, the solid polymer electrolyte may be in the form of a film, having, for example, a thickness of from about 5 μm to about 500 μm, or from about 10 μm to about 100 μm. In some embodiments, the solid polymer electrolyte is in the form of a film which has a substantially constant film thickness over its overall area, for example the variation in thickness over the entirety of the film may be less than 15%, less than 10%, less than 5%, or less than 1%.

In one embodiment, the solid polymer electrolyte is in the form of a homogeneous structure (e.g. film), which may be opaque, clear or translucid. In other embodiments, the film may be heterogeneous, i.e., the components of the solid polymer electrolyte may not be perfectly admixed and there may be regions of a single component within the solid polymer electrolyte. Such a heterogeneous solid polymer electrolyte is captured within the presently described embodiments so long as it still functions as a solid polymer electrolyte within an electrochemical cell.

In some embodiments, the solid polymer electrolyte described herein provides improved conductivity compared to similar solid polymer electrolytes prepared without a phosphonium salt. Conductivity can be assessed, for example, by Electrochemical Impedance Spectroscopy (EIS) of the solid polymer electrolyte, following standard EIS methodology.

The solid polymer electrolyte described herein may also provide, in some embodiments, an electrochemical cell that shows improved discharge capacity at high rate, in comparison to solid polymer electrolytes prepared without any ionic liquids, and in comparison to solid polymer electrolytes prepared with nitrogen-based ionic liquids. Discharge capacity can be measured by incorporating a solid polymer electrolyte within an electrochemical cell and performing cycles of charging and discharging of the cell at different rates. In some embodiments, solid polymer electrolytes described herein have been shown to provide improvements in capacity at higher charging and/or discharging rates and to have a higher average discharge voltage, in comparison to similar electrochemical cells comprising nitrogen-based ionic liquids, or comprising no ionic liquids. The solid polymer electrolytes described herein have also been shown, in some embodiments, to have higher capacities at relatively low operation temperatures, such as at temperatures between 50° C. and 70° C.

In some embodiments, the solid polymer electrolytes described herein may provide for an increased resistance to dendrite formation in comparison to solid polymer electrolytes comprising nitrogen-based ionic liquids, or in comparison to solid polymer electrolytes that do not contain an ionic liquid. Resistance to dendrite formation may be measured by performing a stripping/plating test; placing the solid polymer electrolyte in a symmetric cell between metallic electrodes and cycling current between the electrodes through the solid polymer electrolyte. As the metal is stripped at one electrode and plated at the other, and then stripped and plated in the other direction as current is reversed, dendrites may form that eventually bridge the electrodes through the solid polymer electrolyte. Observation of the voltage during the cycling process can indicate when formation of a bridging dendrite has taken place (reduction of voltage to substantially zero).

The stripping/plating test can also provide information on the stability of the interface between the electrodes and the solid polymer electrolyte, and in some embodiments, the solid polymer electrolytes described herein have been shown to provide for a more stable interface with metallic lithium in comparison to solid polymer electrolytes that either lack an ionic liquid or that comprise nitrogen-based ionic liquids. During the stripping/plating test, instability at the solid polymer electrolyte/electrode interface can be observed through voltage measurements; if the solid polymer electrolyte and electrode materials react to form a passivating layer, a substantial increase in voltage reading is observed as the current remains constant and the resistance increases.

Method of Manufacture

Any method suitable for forming films or bodies from mixtures comprising polymers may be used to form the solid polymer electrolytes as defined herein. Such methods include, for example, melt extrusion, melt-blowing, and solvent casting. In an embodiment, the metal ion conductive polymer system, the phosphonium salt, and the dissociable metal salt are admixed prior to film formation and the admixture is brought to a temperature above the melting temperature of the metal ion conductive polymer system prior to film formation.

In an embodiment, the solid polymer electrolyte is prepared in film form by melt extrusion. Any hot melt extrusion technique known in the art as suitable for forming a film from a polymer containing mixture may be used. In one embodiment, this process comprises a) providing a metal ion conductive polymer system, a phosphonium salt, and a dissociable metal salt, and forming a mixture thereof; b) heating the mixture; and c) forming the mixture into a film. In such an embodiment, it may be possible to form the solid polymer electrolyte without adding any solvents to the mixture. Avoiding the use of solvents may provide benefits of reduced cost, reduced processing time, and reduced environmental impact.

In one embodiment, the metal ion conductive polymer system, the phosphonium salt, and the dissociable metal salt are admixed at a temperature lower than the melting temperature of the phosphonium salt, such that all components are in solid form during the admixture step. For example, admixing may be carried out in a refrigerated vessel or in a refrigerated environment. In one embodiment, liquid nitrogen or dry ice may be used to lower the temperature of the components. For example, the admixing step may be carried out at a temperature between about −210° C. and −50° C.

Alternatively, the metal ion conductive polymer system and the dissociable lithium salt may be admixed in solid form, and the phosphonium salt subsequently added, in solid or liquid form, prior to melt extrusion. Alternatively, the metal ion conductive polymer system and the dissociable metal salt can be fed into an extruder, and the ionic liquid subsequently added in the liquid form during melt extrusion.

The metal ion conductive polymer system, the phosphonium salt, and/or the dissociable metal salt may be ground or made to have a particle size suitable for melt extrusion by any suitable method known in the art. Each component may be ground or processed separately prior to admixing, or one or more components may be combined prior to being ground or processed.

The conversion of the admixture, in powder or a particulate form, into a product of uniform shape, aka a body, by melt extrusion will be known to those in ordinary skill in the art. For example, the components may be heated and forced through an orifice or die under controlled temperature, pressure, feeding rate, and screw speed. Extruders generally consist of one or two rotating screws (either co-rotating or counter-rotating) inside a stationary cylindrical barrel. The extruder may also be fitted for post-extrusion processing of the material, such as with rollers to form the extruded material into a film of a desired thickness.

Following formation, the solid polymer electrolyte may be deposited on a backing layer, which may be a release layer. The backing layer may be, for example, polymeric or metallic. The backing layer may bear a release coating, such as a Teflon coating. In another embodiment, the solid polymer electrolyte may be deposited directly on an electrode material for the electrochemical cell the solid polymer electrolyte is to be part of, such as a metallic film.

In some embodiments, one or more of the melt extrusion process steps, from admixture, heating extrusion, and any post processing, are carried out in a substantially anhydrous atmosphere, for example in an environment having a moisture level of less than 50 ppm. One or more of the process steps may also be carried out under an inert atmosphere, for example under argon. The components, prior or following admixture, may also be dried, e.g. under vacuum, prior to the extrusion process.

Crosslinking of the Solid Polymer Electrolyte

In one embodiment, the solid polymer electrolyte is crosslinked following formation of the solid polymer electrolyte body, which may be a film, to increase physical stability of the solid polymer electrolyte. In order to obtain a crosslinked solid polymer electrolyte, the polymer system may comprise cross-linkable components, and the polymer system may further comprise a crosslinking initiator. Alternately, a crosslinking initiator may be added to the mixture prior to solid polymer electrolyte formation.

Following extrusion and optionally following any post-processing, or following solvent casting, the solid polymer electrolyte may be exposed to an environment that causes crosslinking between cross-linkable components of the polymer system. For example, the solid polymer electrolyte may be irradiated (for example by UV or infrared) or it may be heated, depending on the crosslinking initiator used and the type of crosslinking reaction which is to take place within the solid polymer electrolyte. In one embodiment, the solid polymer electrolyte is crosslinked by radical polymerization initiated by UV exposure, using a UV activated crosslinking initiator, such as benzophenone. Any other suitable radical polymerization initiator may also be used. The intensity and duration of the UV irradiation will be determined based on the concentration of crosslinking initiator present in the solid polymer electrolyte, the concentration of cross-linkable groups, and the desired physical characteristics of the solid polymer electrolyte.

Crosslinking polymerization may be carried out for any suitable duration. In some embodiments, cross-linking polymerization may be carried out, for example, for a duration of less than 20 minutes, a duration from 10 minutes to 1 hour, or a duration of from 20 minutes to 40 minutes. Intensity and duration of crosslinking polymerization may also be tailored to be short, i.e. less than 5 minutes, less than 2 minutes, less than 1 minute, or less than 30 seconds, to permit continuous production of the solid polymer electrolyte.

Electrochemical Cell

In some embodiments, the solid polymer electrolyte is to be placed between an anode and a cathode to form an electrochemical cell, such that conduction of metal ions flows through the solid polymer electrolyte. The solid polymer electrolyte may be adjacent to the anode, to the cathode or to both. There may also be one or more layers of material between the solid polymer electrolyte and one or both of the anode and the cathode, as long as metal ions flow between the anode and cathode, through the solid polymer electrolyte.

Suitable electrode materials for use in metal-based electrochemical cells will be known to those of skill in the art (for examples of suitable electrodes for lithium-based electrochemical cells, see Marom et al, J. Mater. Chem., 2011, 21, 9938). Examples of suitable anodes for lithium-based electrochemical cells include lithium metal, graphite, silicon, silicon alloys, composites of silicon and carbon, lithium titanium oxides $Li_xTO_y$, and other metal oxides MO, while examples of suitable cathodes for lithium-based electrochemical cells include metal oxides such as lithium manganese oxides, lithium cobalt oxides, lithium nickel manganese cobalt oxides, lithium nickel cobalt aluminum oxides and combinations of those, and olivines LiMPO4, where M is Fe or Mn, as well as sulfur-containing compounds typically used in lithium-sulfur batteries.

EXAMPLES

The following specific examples are provided to illustrate various aspects of the invention. It will be understood, however, that the specific details given in each example have been selected for the purpose of illustration and are not to be construed as limiting the scope of the invention. Generally, the experiments were conducted under similar conditions unless otherwise noted.

Example 1

Characterization of Phosphonium Ionic Liquids

Several ionic liquids, as shown in Table 1, were selected as candidate components for a solid polymer electrolyte. As the inventors intended to use melt extrusion to form solid polymer electrolyte films, the ionic liquids were evaluated to verify that they are stable at temperatures used in melt extrusion methods.

Both nitrogen-based and phosphonium-based ionic liquids (N-ILs and P-ILs, respectively) were investigated. The molecular weight, density, melting points and viscosities for the studied ionic liquids are provided below in Table 1.

TABLE 1

| Physical characteristics for ionic liquids based on the bis(trifluoromethanesulfonyl)imide (TFSI) anion. | | | | | |
|---|---|---|---|---|---|
| Ionic liquid | MW (g/mol) | Density (g/cm³) | Melting point (° C.) | Viscosity (mPas · s) | Cation chemistry |
| N-IL-1 | 396.37 | — | 12.2 | — | N-Butyl-N-trimethylammonium |
| N-IL-2 | 422.41 | — | 16.83 | — | 1,2-Dimethyl-3-propylimidazolium |
| N-IL-3 | 422.41 | — | −12.49 | — | N-Methyl-N-propylpiperidinium |
| N-IL-4 | 391.31 | — | −14.06 | — | N-Butyl-N-methylpyrrolidinium |
| N-IL-5 | 419.36 | — | 10.28 | — | 1-Ethyl-3-methylimidazolium |
| PX-48 | 595.68 | 1.18 | <−60 | 250 | Tri-n-butyloctylphosphonium |
| PX-28 | 511.52 | 1.26 | <−60 | 129 | Triethyloctyl-phosphonium |
| PX-4M | 497.50 | 1.28 | 16 | 207 | Tri-n-butylmethylphosphonium |

Figure 3:
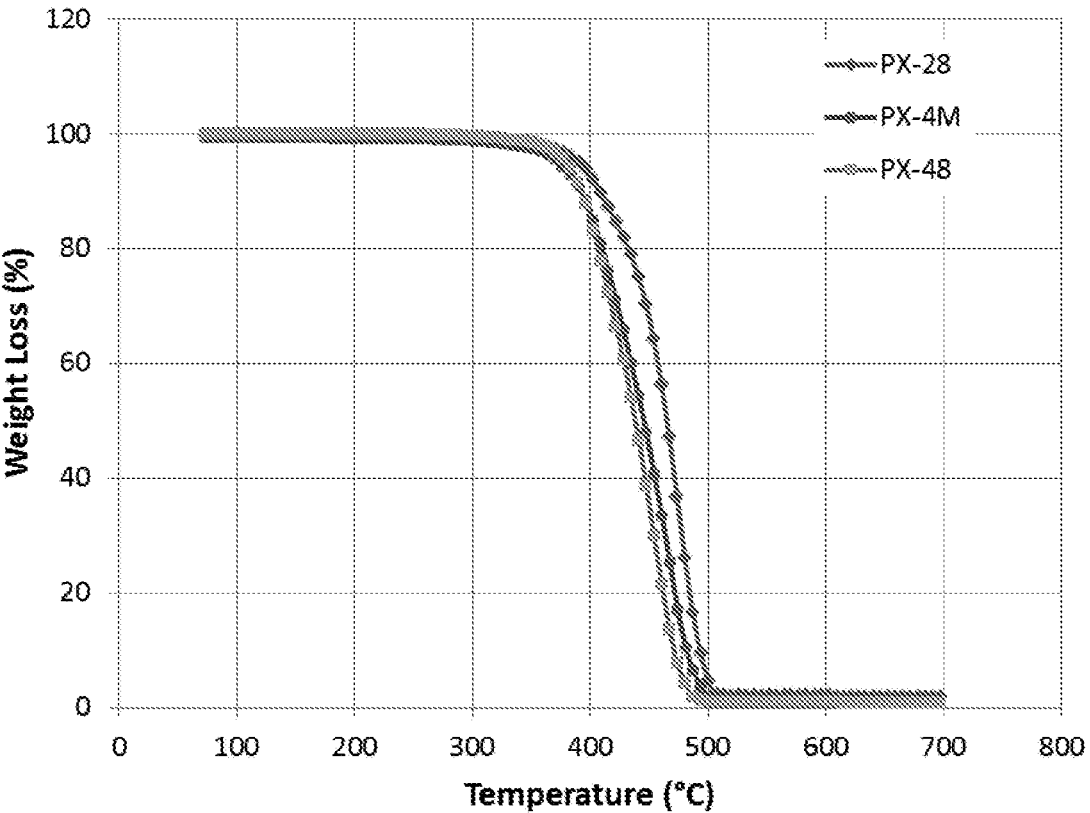
FIG. 3 shows thermogravimetric analysis of the phosphonium-based ionic liquids depicted in FIG. 1.

The ionic liquids listed in Table 1 were subjected to differential screening calorimetry (DSC) and thermogravimetric analysis (TGA). It was confirmed by DSC analysis (FIG. 2) that the phosphonium-based ionic liquids tested have a melting temperature below room temperature. The P-ILs were also found, by thermogravimetric analysis (FIG. 3), to be stable up to temperatures above 350° C. The N-ILs were also confirmed by thermogravimetric analysis to be stable at a temperature of 350° C.

Example 2

Preparation of Solid Polymer Electrolytes by Melt Extrusion

Multiple variants of solid polymer electrolytes were prepared by melt extrusion with different ionic liquids. Additionally, a reference solid polymer electrolyte was formed without an ionic liquid. The solid polymer electrolytes were prepared from a polymer system comprising a crosslinkable conductive polymer, polyethylene oxide (PEO) (600K mol. wt.; Polyscience) and a support polymer, PVDF-co-HFP (Kynar Flex 2500 Arkema); along with a metal salt, LiTFSI (Aldrich); a radical polymerization initiator, benzophenone; and an ionic liquid, as described below.

The volume ratio of PEO to PVDF-co-HFP in each instance was 1:1, and the concentration of LiTFSI was 10 mol %/PEO. For the solid polymer electrolytes comprising ionic liquids, 10 wt. %/PEO of benzophenone was added, while for the reference solid polymer electrolyte only 5 wt. % /PEO of benzophenone was used.

In addition to the reference solid polymer electrolyte (i.e. ionic liquid-free solid polymer electrolyte), eight solid polymer electrolyte films were prepared with various nitrogen-based ionic liquids and phosphonium-based ionic liquids. Each ionic liquid cation was associated with the bis(trifluoromethanesulfonyl)imide (TFSI) anion. The specific ionic liquids used were N-Butyl-N-trimethylammonium (N-IL-1), 1,2-Dimethyl-3- propylimidazolium (N-IL-2), N-Methyl-N-propylpiperidinium (N-IL-3), N-Butyl-N-methylpyrrolidinium (N-IL-4), 1-Ethyl-3- methylimidazolium (N-IL-5), Tri-n-butyloctylphosphonium (PX-48), Triethyloctyl-phosphonium (PX-28), and Tri-n-butylmethylphosphonium (PX-4M). In each instance, 15 wt % of ionic liquid was used.

Material preparation and admixing was carried out in anhydrous conditions ($H_2O$<50 ppm). The components were dried, and the polymers were ground prior to admixing. The components were admixed and further ground under liquid nitrogen cooling, at which temperature the ionic liquids were in solid form. The obtained admixture was extruded at 130° C. with a twin-screw micro-extruder and fed to a film forming roller of 6 cm width to form 40 μm thick films having a width of approximately 3 to 4 cm. Visually, the films were totally transparent. The produced films were deposited on a Teflon coated film and crosslinked by exposure for 20 minutes to UV sources (UVGL-58, ShortWave SW 254 and LongWave LW 365 nm) fitted to a Chromato-Vue cabinet.

Example 3

Solid Polymer Electrolyte Characterization

Figure 4:
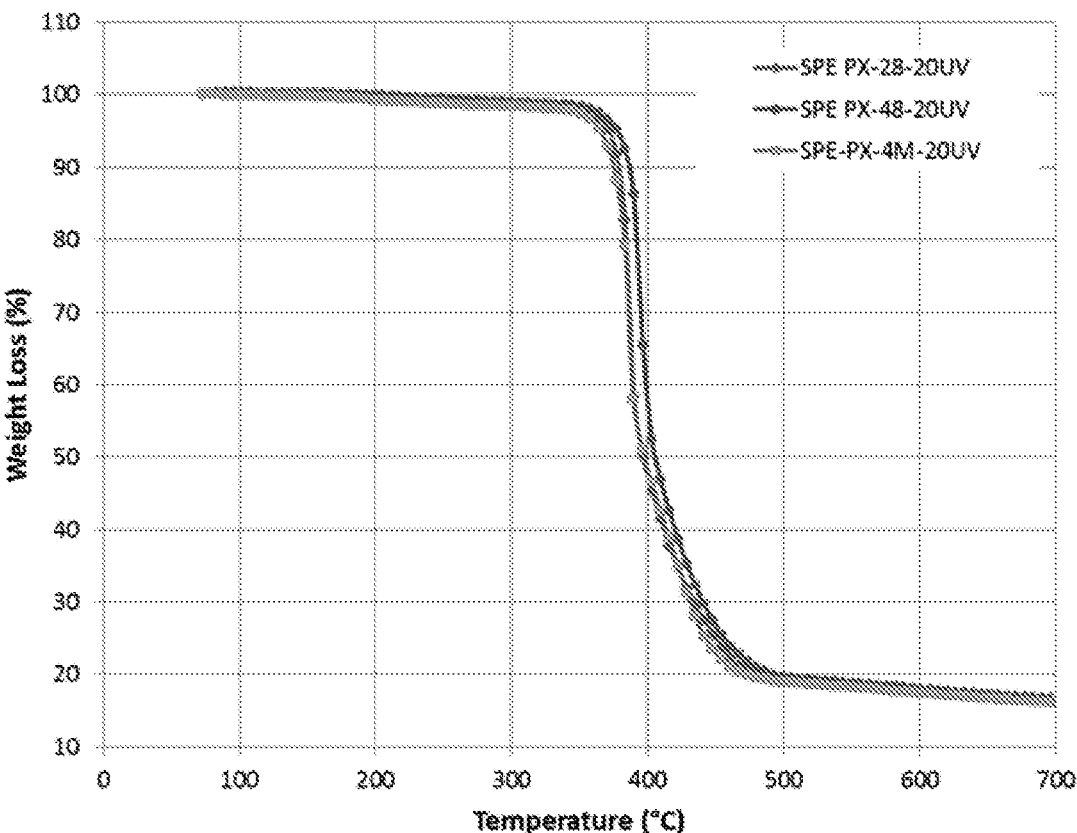
FIG. 4 depicts thermogravimetric analysis of solid polymer electrolytes containing the phosphonium-based ionic liquids depicted in FIG. 1.

The P-IL-containing solid polymer electrolytes prepared in Example 2 were characterized by thermogravimetric analysis (FIG. 4), and were found to remain stable up to temperatures above 350° C.

Figure 5:
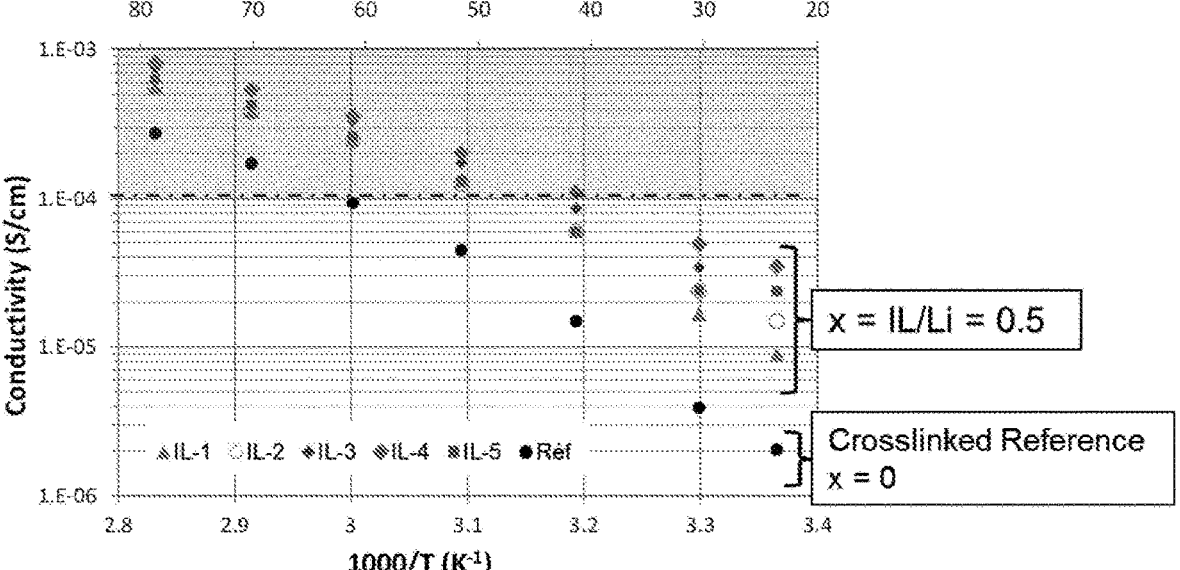
FIG. 5 depicts ionic conductivity of solid polymer electrolytes containing nitrogen-based ionic liquids at different temperatures.
Figure 6:
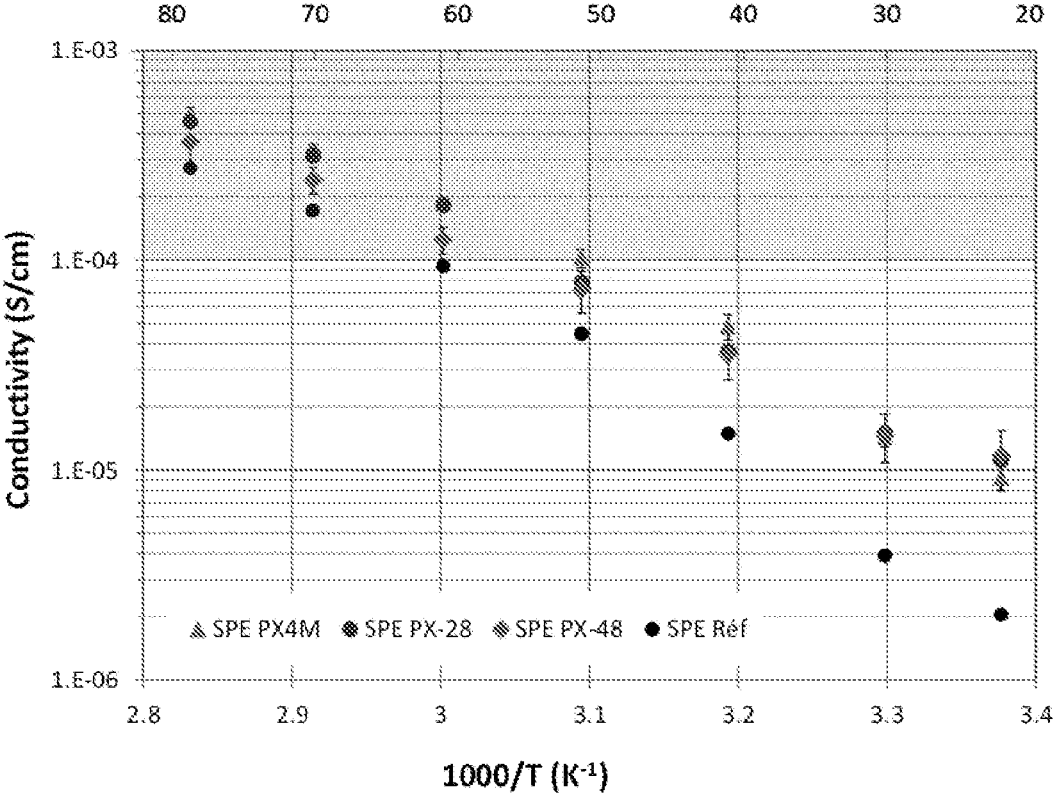
FIG. 6 depicts ionic conductivity of solid polymer electrolytes containing the phosphonium-based ionic liquids depicted in FIG. 1, at different temperatures.

The conductivities of the solid polymer electrolytes prepared were measured by Electrochemical Impedance Spectroscopy (EIS) at various temperatures. The results for N-IL containing solid polymer electrolytes are shown in FIG. 5, while the results for P-IL containing solid polymer electrolytes are shown in FIG. 6. The results are compared with a reference solid polymer electrolyte, also shown in both figures.

While an increase in conductivity was observed for the solid polymer electrolytes comprising ionic liquids in comparison to the reference solid polymer electrolyte lacking an ionic liquid, N-IL solid polymer electrolytes were observed to have a higher conductivity than the P-IL solid polymer electrolytes. Without wishing to be bound by theory, it is believed that the relatively lessened increase in conductivity for the P-IL containing solid polymer electrolytes, as compared to the N-ILs, is due to the larger size of the phosphonium cations in comparison to the cations for the N-ILs, which larger size may reduce the mobility of these cations within the solid polymer electrolyte. As EIS measures absolute conductivity of all ionic species within the film, it does not provide specific information on lithium ion conductivity.

Example 4

Preparation and Characterization of Electrochemical Cells

Electrochemical cells comprising solid polymer electrolytes prepared as described in Example 2 were prepared by layering a $LiFePO_4$ cathode layer, the solid polymer electrolyte as prepared, and an anode film comprised of metallic lithium.

The $LiFePO_4$ cathode layer was prepared by bar-coating a cathode ink onto a carbon-coated aluminum foil. The mixture used to form the cathode ink comprised 60 wt. % $LiFePO_4$ (carbon-coated particles) (Targray, $H_2O$<1000 ppm), 10 wt. % carbon black, (Imerys SP Lithium), 22.6 wt. % PEO (1,000,000 g/mol), and 7.4 wt. % LiTFSI (5 mol % vs. PEO), dispersed in an organic solvent (dimethyl formamide). After solvent evaporation, the deposited material was hot pressed to optimize compaction of the electrode. The obtained electrode had a thickness of 65±5 μm (aluminum foil: 30±1 μm).

Full electrochemical cycling was investigated for cells prepared with solid polymer electrolytes comprising N-Butyl-N-methylpyrrolidinium (N-IL-4) and Triethyloctyl-phosphonium (P-IL-PX-28) to assess capacity under different charge/discharge rates at different temperatures. For comparison purposes, a cell was also prepared with the reference solid polymer electrolyte, which does not comprise an ionic liquid.

Before testing, each cell was first allowed to equilibrate to a specific temperature (40° C., 50° C., 60° C. or 70° C.) for three hours. The cells were then subjected to cycling protocols as set out in Table 2:

TABLE 2

| Cycling protocol | | |
| --- | --- | --- |
| # of cycles | Charge | Discharge |
| 10 | C/10 | C/10 |
| 5 | C/10 | C/2 |
| 5 | C/10 | C |
| 5 | C/10 | 2C |
| 5 | C/2 | C/2 |
| 5 | C | C |
| 5 | C/10 | C/10 |

For each test, the cells were kept within limits of 2.5-3.7 V/Li. The cells were maintained at 2.5 V for 8 h between each cycle to relax all polarization effects in the polymer electrolyte.

The cycling results for each of the N-Butyl-N-methylpyrrolidinium (PYR14, aka N-IL-4), Triethyloctyl-phosphonium (aka P-IL-PX-28) containing solid polymer electrolytes, and reference cells are shown in FIGS. 7a-d. Each point shows the average capacity of three cells measured at the specified charge and discharge rates, at different temperatures.

Figure 7A:
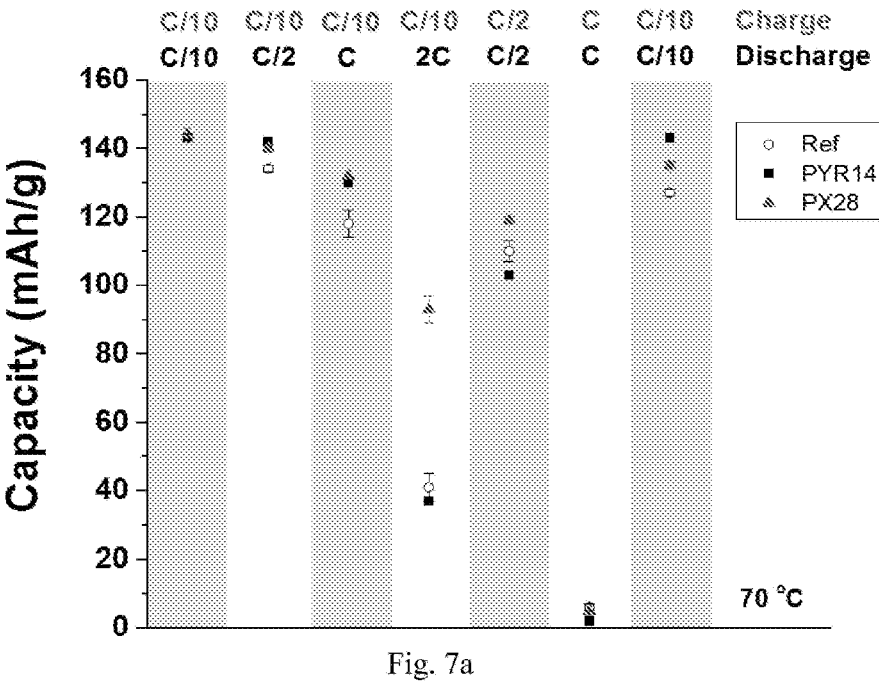
FIG. 7 depicts performance results at different temperatures for polymer electrolyte batteries assembled with metallic lithium anodes, LiFePO4-based cathodes and different solid polymer electrolytes (containing or not containing ionic liquids).
Figure 7B:
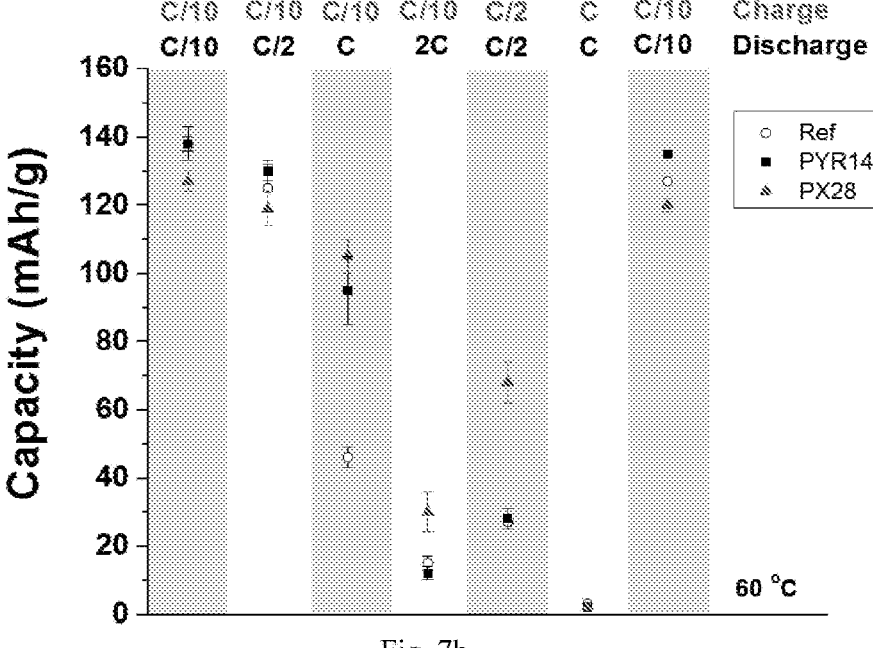
Figure 7C:
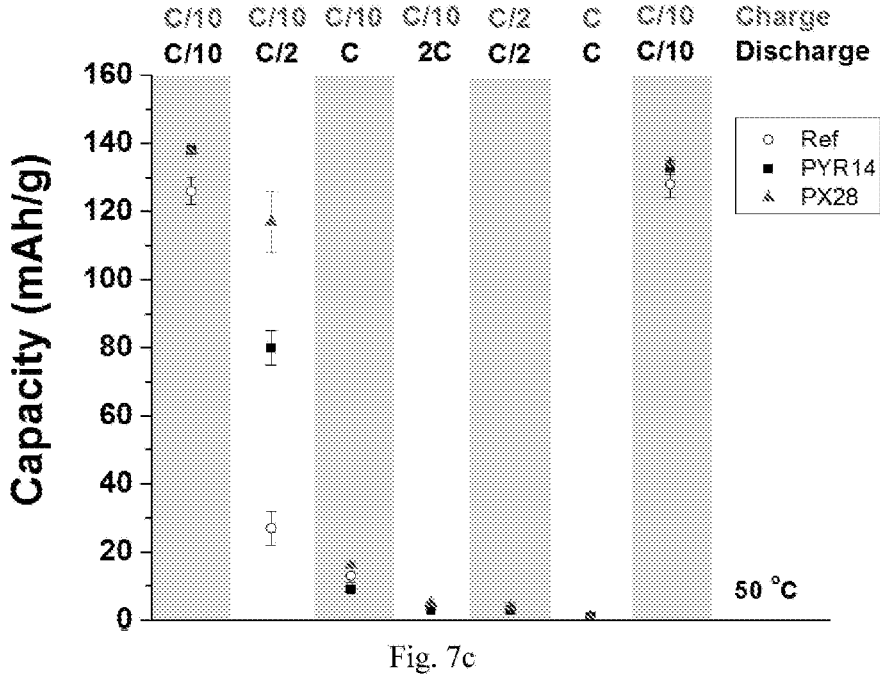
Figure 7D:
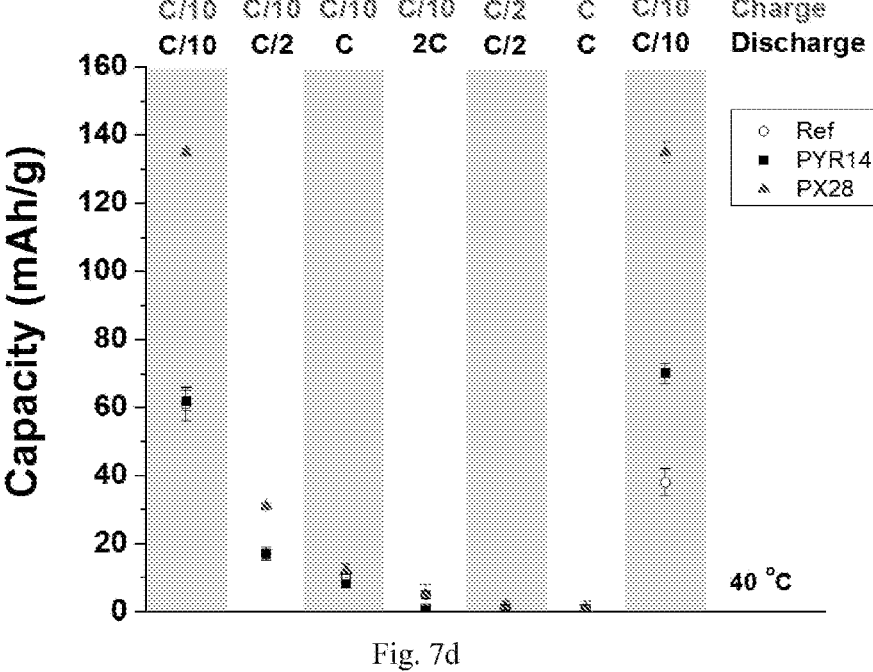

As can be seen from FIG. 7a, at 70° C. the cell constructed with the P-IL-PX28 containing solid polymer electrolyte shows improved capacity over both the reference cell and the N-IL-4 cell at high power (i.e. at the higher discharge rate 2C). It can also be seen that while the N-IL-4 cell contains an ionic liquid, its capacity at high discharge rates (2C) is not substantially different from that of the reference cell, which does not comprise an ionic liquid.

At 60 ° C. (FIG. 7b), both cells containing an ionic liquid within the solid polymer electrolyte show improved capacity over the reference cell at C-rate discharge. The P-IL-PX28 cell also slightly outperformed the N-IL-4 cell at 2C-rate discharge. Moreover, the P-IL-PX28 containing cell outperformed both of the other cells under faster charging conditions (C/2).

At 50 ° C. (FIG. 7c), the reference cell was found to lose its capacity at C/2 discharge rates, while increased capacities were maintained for the N-IL-4 containing cell (about 80 mAh/g) and even more so for the P-IL-PX28 containing cell (about 120 mAh/g).

Finally, at 40 ° C. (FIG. 7d), only the P-IL-PX28 containing cell was found to be able to retain substantially normal function at a C/10 charge/discharge rate, maintaining a cell capacity of about 140 mAh/g.

While the conductivities measured by EIS (Example 3, FIGS. 5 and 6) indicate that the N-IL containing solid polymer electrolytes provided an improvement in conductivity over the P-IL containing solid polymer electrolytes, the cell cycling results (FIGS. 7a-d) indicate an increase in lithium ion mobility within the P-IL-PX28 containing solid polymer electrolyte in comparison to the N-IL containing solid polymer electrolyte, particularly at lower temperatures. The enhanced lithium ion mobility permitted by the P-IL-PX28 has effects at all the tested temperatures, allowing the cell to deliver higher energy in conditions when higher lithium ion mobility is needed (i.e. at higher power and/or low temperature).

Figures 8A, 8B:
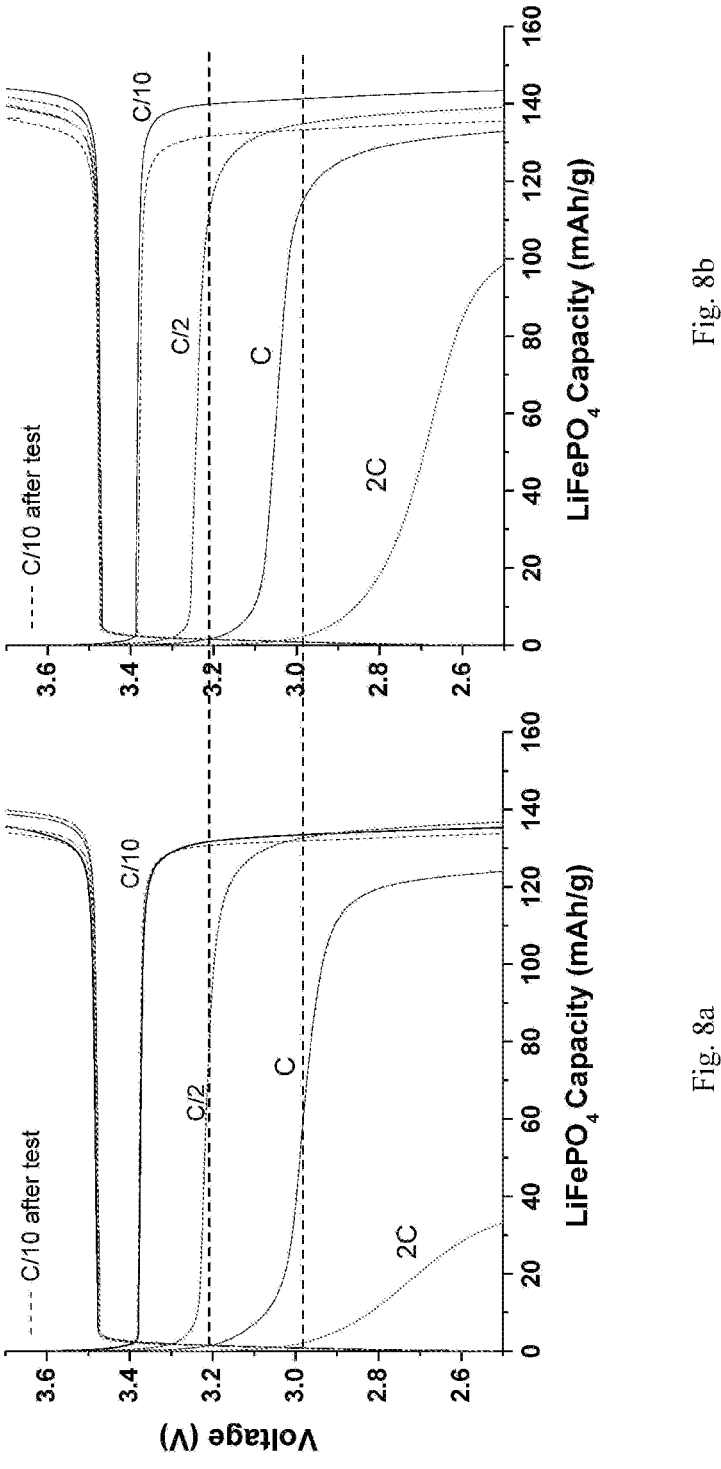
FIGS. 8a and 8b depict charge-discharge cycling curves of polymer electrolyte batteries with a reference solid polymer electrolyte (a) and a solid polymer electrolyte containing a phosphonium-based ionic liquid (triethyloctylphosphonium (aka PX28)) (b).

Cycling curves obtained for the reference and P-IL-PX28 containing cells at 70° C. are also provided in FIGS. 8a and 8b, respectively. As can be observed, the voltage during discharge was higher with the P-IL solid polymer electrolyte than it is with the reference. This is particularly apparent at a discharge rate C, where both solid polymer electrolytes show a similar capacity, but the voltage of discharge for the P-IL-PX28 solid polymer electrolyte is markedly higher.

Example 5

Stability Against Dendrite Formation

In order to assess the solid polymer electrolyte's stability against dendrite formation, and also to assess the stability of the solid polymer electrolyte/lithium interface, accelerated stripping/plating tests were performed. In these tests, solid polymer electrolytes were sandwiched between metallic lithium films, and stripping/plating of metallic lithium was provoked by application of a 0.5 mA/cm$^2$ current between the lithium films, which current was inverted every hour. Impedance of the system was also measured every 24 hours.

Figures 9A, 9B, 9C:
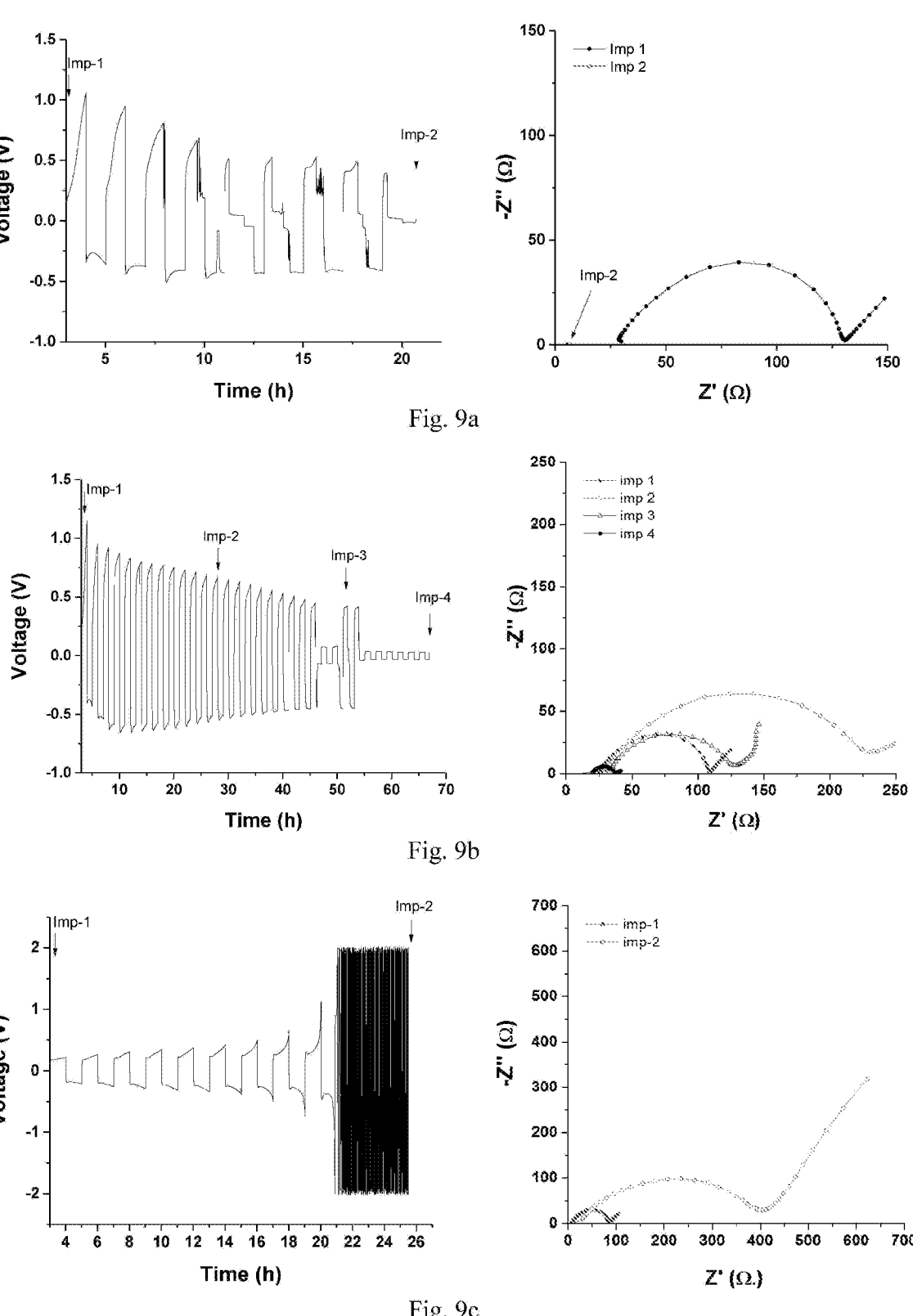
FIGS. 9a, 9b, 9c, 9d, and 9e depict lithium stripping/plating and electrochemical impedance spectroscopy (EIS) analysis for different solid polymer electrolytes.

FIGS. 9a-e show both the voltage/time and EIS measurements for the stripping/plating test for:

FIG. 9a—a non-crosslinked reference solid polymer electrolyte

FIG. 9b—a crosslinked reference solid polymer electrolyte

FIG. 9c—a solid polymer electrolyte comprising N-IL-1

Figures 9D, 9E:
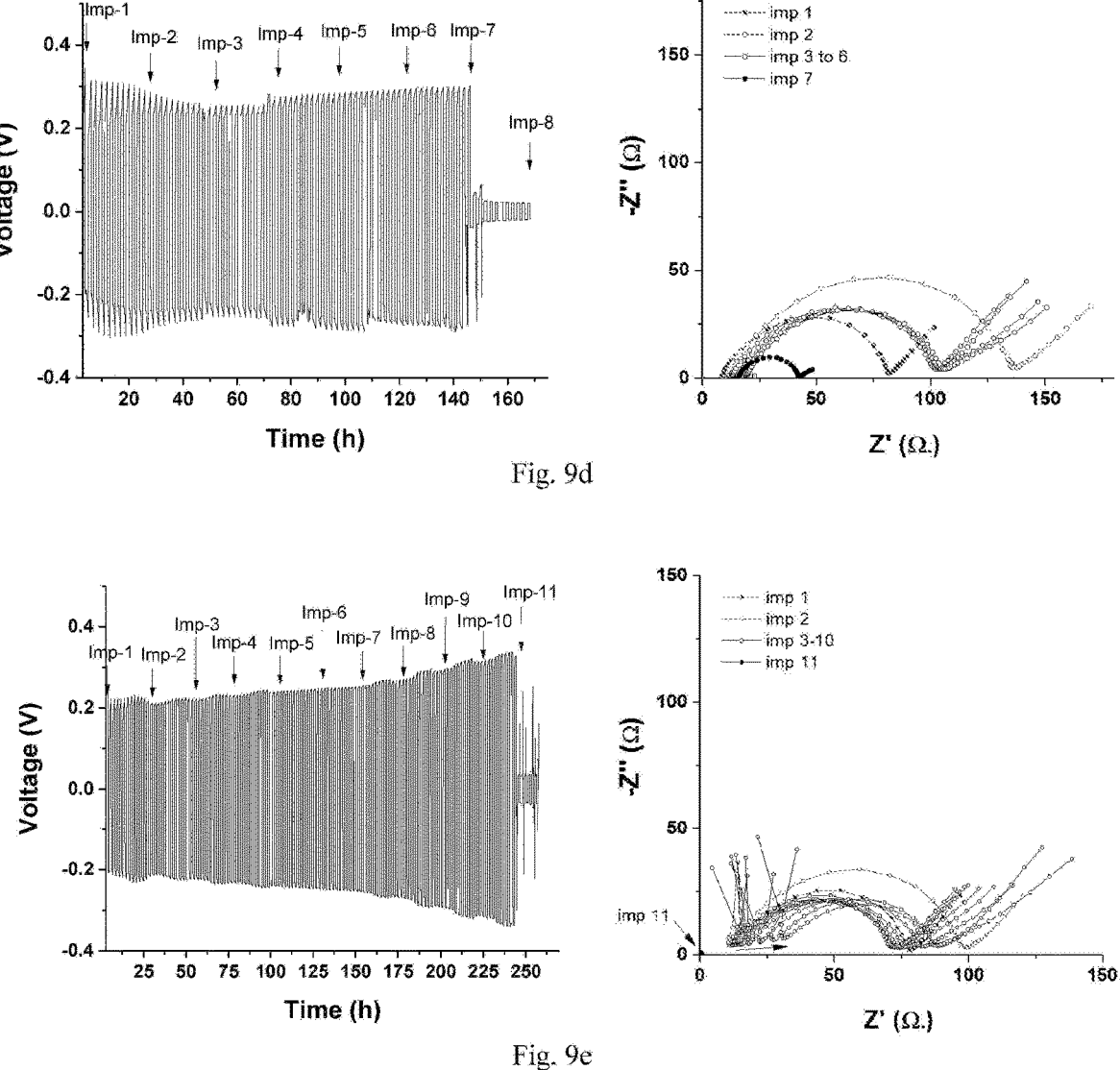

FIG. 9d—a solid polymer electrolyte comprising N-IL-4

FIG. 9e—a solid polymer electrolyte comprising PX-28

Under the stripping/plating test, the applied currents cause stripping of the lithium from one electrode and plating of lithium onto the other electrode. As the current is inverted the same happens in the other direction. From these repeated stripping/plating cycles, dendrites can form, through the solid polymer electrolyte, to breach the gap between the electrodes. Formation of bridging dendrites is observed by a sudden drop of the measured voltage, as the dendrites cause a short in the system (i.e. substantial reduction in resistance).

A non-crosslinked reference solid polymer electrolyte was prepared according to the protocol described in Example 2, except that the solid polymer electrolyte film was not exposed to UV irradiation to crosslink the PEO polymer therein. As can be seen from FIG. 9a, application of the current across the solid polymer electrolyte produced an erratic response, with dendrites producing first microshorts at about 8 h, first real short after 12 hours and definitive short after about 20 hours. The EIS data confirms the short, impedance 2 (performed at 21 hours) showing a resistance (X-axis value) near 0 ohm.

Crosslinking of the reference solid polymer electrolyte (without ionic liquid) prepared according to the protocol described in Example 2 provided a better stripping/plating response, as shown in FIG. 9b. However, after 45 hours, dendrites were initially produced, and the system permanently failed at about 55 hours. Without wishing to be bound by theory, it is believed that the resumption of the system response at 50 hours, following an initial failure, is due to the stripping/plating action which may temporarily break the bridging dendrite that had grown between the lithium electrodes. Shortly thereafter, however, a stable bridging dendrite is reformed as shown in FIG. 9b.

The stripping/plating test also provides information on the stability of the interface between the solid polymer electrolyte and lithium electrode under applied current. When the lithium/solid polymer electrolyte interface is unstable, the solid polymer electrolyte and lithium may interact to form an increasingly passivating layer through which ion conductivity is finally impaired. Such an occurrence can be observed in FIG. 9c, where the solid polymer electrolyte containing N-IL-1, prepared according to the protocol described in Example 2, was tested. After 20 hours, the resistance between the lithium electrodes increased and resulted in a marked increase in voltage measurement, indicating that a passivating layer was formed between the solid polymer electrolyte and the lithium electrode. The EIS data showed an impedance increase from 90 to 400 ohms.

Addition of N-IL-4 to the solid polymer electrolyte was found to provide an increase in stability against dendrite formation. As shown in FIG. 9d, with this solid polymer electrolyte system, stability against dendrite formation was maintained for up to about 145 hours. The EIS shows that a passivating layer first formed at the interface between the solid polymer electrolyte and the metallic film (imp1-to-imp2 transition). In the subsequent cycles, the interface enhanced its ability to conduct lithium ions (imp2-to-imp3 transition) then was stable (imp3-to-imp6) until a dendrite finally breached the solid polymer electrolyte (imp7), drastically reducing the impedance.

Use of a phosphonium salt as the ionic liquid was found to provide a further marked increase in stability against dendrite formation. As shown in FIG. 9e, stability to dendrite formation was maintained for over 230 hours for a solid polymer electrolyte comprising P-IL-PX28, prepared according to the protocol described in Example 2. EIS data reveals a comparable behavior as with N-IL-4.

Figure 10:
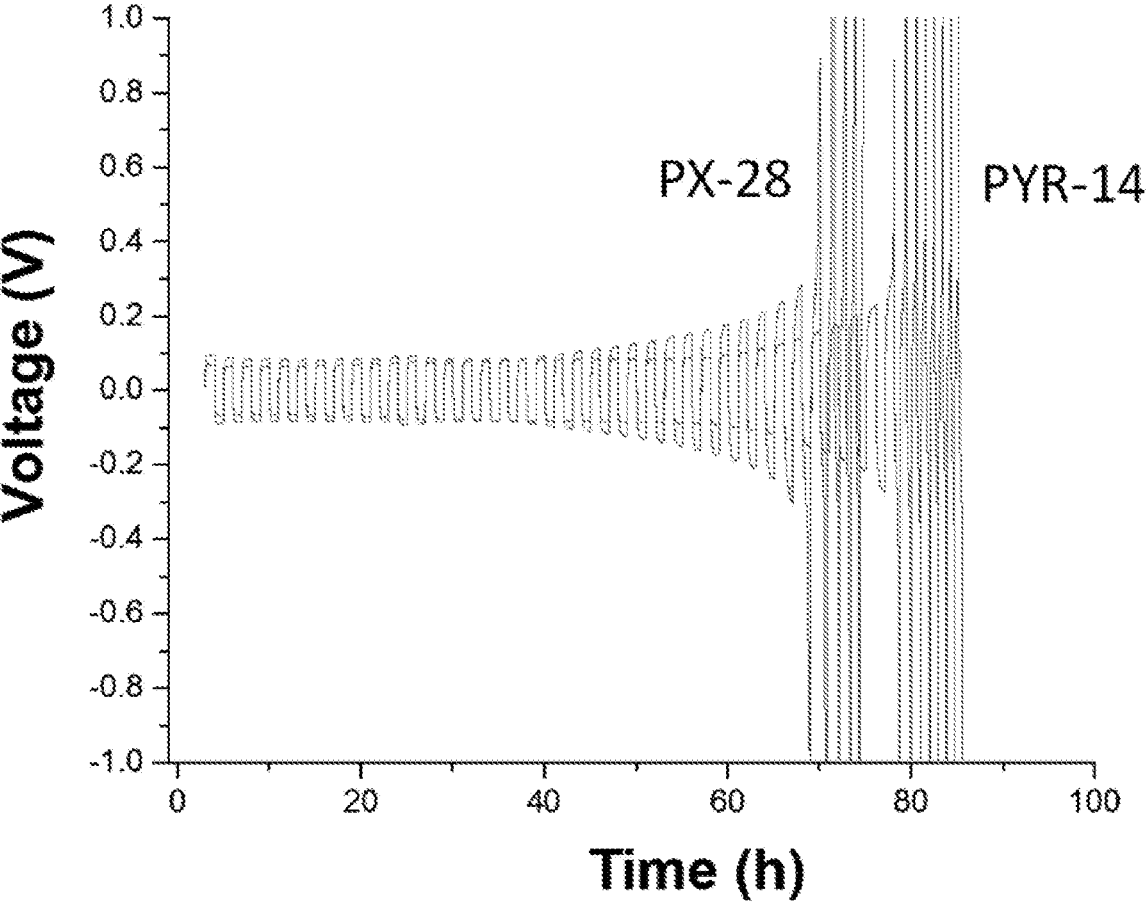
FIG. 10 depicts lithium stripping/plating curve for polymer-free ionic liquid-based electrolytes.

For comparative purposes, stripping/plating tests were also carried out with ionic liquids only, i.e. without polymer, to compare the ability of the ionic liquids to function as electrolytes in lithium cells. Poor stripping/plating behavior was observed for both the N-IL-4 and P-IL-PX28 ionic liquids alone, as shown in FIG. 10. After 65 hours, the P-IL-PX28 system failed, resulting in a marked increase in voltage (possibly indicative of the production of a passivating layer at the ionic liquid/lithium electrode interface). A similar failure was observed for the N-IL-4 system after about 75 hours.

Example 6

Physical Stability of Solid Polymer Electrolytes Comprising Ionic Liquids

In order to assess the physical stability of solid polymer electrolytes comprising ionic liquids, a series of solid polymer electrolytes were prepared with varying concentration of ionic liquids, and these were then subjected to an ionic liquid extraction test and then observed by scanning electron microscopy (SEM).

Figure 11:
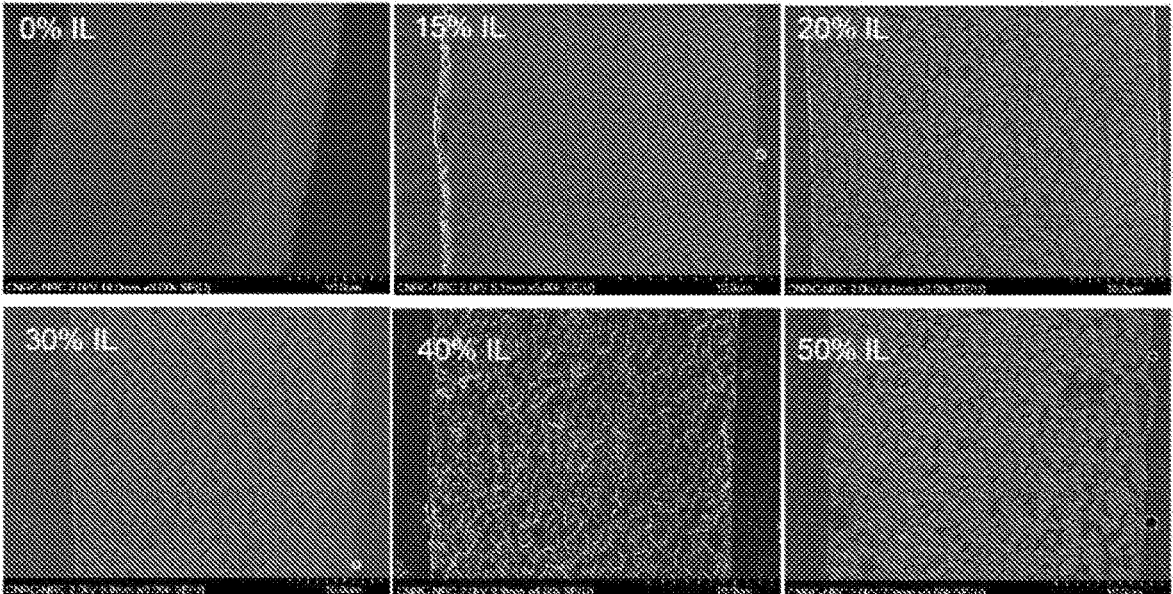
FIG. 11 shows cross-sectional scanning electron microscopy (SEM) images of solid polymer electrolytes after having extracted the ionic liquid phase.

Following the general directions set out in Example 2, a series of solid polymer electrolytes was prepared comprising 0, 15, 20, 30, 40 and 50 wt % of ionic liquid (N-IL-4). These were then submerged in water for 5 days to extract the ionic liquid by dissolution and observed under SEM. FIG. 11 provides the SEM images for the IL-extracted solid polymer electrolytes having different ionic liquid concentration. As can be observed, while the stability of the solid polymer electrolytes after ionic liquid extraction diminishes as the concentration of ionic liquid increases, the solid polymer electrolyte produced with 50% of ionic liquid retains its structural integrity even after the ionic liquid has been totally extracted. While this physical stability test was carried out with an N-IL solid polymer electrolyte, similar stability results are expected of a P-IL solid polymer electrolyte.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

All publications, patents and patent applications cited in this specification are herein incorporated by reference as if each individual publication, patent or patent application were specifically and individually indicated to be incorporated by reference.

What is claimed is:

1. A solid polymer electrolyte comprising
a. a dissociable metal salt;
b. a metal ion conductive polymer system; and
c. a phosphonium salt;

wherein
the dissociable metal salt is soluble in the metal ion conductive polymer system and the phosphonium salt;
the dissociable metal salt, metal ion conductive polymer system, and phosphonium salt form a homogeneous structure;
the phosphonium salt has the general formula $[PR_1R_2R_3R_4]X$, where each of $R_1$, $R_2$, $R_3$ and $R_4$ are independently selected from $C_1$ to $C_{12}$ hydrocarbons, which hydrocarbons may be optionally substituted by 1 to 5 heteroatoms selected from N, O, and S, and X is an anion;
the phosphonium salt has a melting point below 80° C.; and
the solid polymer electrolyte is solid at a temperature of 20° C.

2. The solid polymer electrolyte according to claim 1, wherein the dissociable metal salt is a lithium salt, a sodium salt, an aluminum salt, or a magnesium salt.

3. The solid polymer electrolyte according to claim 1, wherein the dissociable metal salt is a lithium salt comprising lithium bis (trifluoromethanesulfonyl) imide (LiTFSI), lithium bis (fluorosulfonyl) imide (LiFSI), lithium bis-(perfluoroethylsulfonyl) imide (LiBETI), lithium trifluoromethanesulfonate (LiCF3SO3), lithium hexafluorophosphate (LiPF6), lithium hexafluoroborate (LiBF4), lithium perchlorate (LiClO4), lithium bis (oxalato) borate (LiBOB), or a mixture of two or more thereof.

4. The solid polymer electrolyte according to claim 1, wherein the metal ion conductive polymer system comprises polyethylene oxide, polypropylene oxide, polybutylene oxide, a polymer bearing perfluorosulfonic acid functionalities, a polymer bearing trifluoromethanesulfonylimide functionalities, a copolymer of one or more thereof, or a mixture of two or more thereof.

5. The solid polymer electrolyte according to claim 1, wherein the metal ion conductive polymer system comprises polyvinylidene fluoride (PVDF), polyvinylidene fluoride-co-hexafluoropropylene (PVDF-HFP), polyvinylidene fluoride-co-trifluoroethylene (PVDF-TrFE), poly (methyl methacrylate) (PMMA), nitrile butadiene rubber (NBR), polytetrafluoroethylene (PTFE), or a combination of two or more thereof.

6. The solid polymer electrolyte according to claim 1, wherein the metal ion conductive polymer system comprises an additive that lowers the crystallinity of one or more polymers or copolymers comprised in the metal ion conductive polymer system, wherein the additive is a copolymer formed from a comonomer.

7. The solid polymer electrolyte according to claim 1, wherein the phosphonium salt has a melting point below 25° C.

8. The solid polymer electrolyte according to claim 1, wherein the phosphonium salt is physically stable at a temperature of 160° C.

9. The solid polymer electrolyte according to claim 1, wherein the phosphonium salt comprises triethyloctylphosphonium, tri-n-butyloctylphosphonium, tri-n-butylmethylphosphonium, or a mixture of two or more thereof.

10. The solid polymer electrolyte according to claim 1, wherein the solid polymer electrolyte comprises the phosphonium salt in an amount of from about 5 wt % to about 50 wt %.

11. The solid polymer electrolyte according to claim 1, wherein the solid polymer electrolyte comprises from about 5 mol % to about 25 mol % of the dissociable metal salt.

12. The solid polymer electrolyte according to claim 1, which is in the form of a film.

13. The solid polymer electrolyte according to claim 1, further comprising a radical polymerization initiator, wherein the radical polymerization initiator comprises pentaerythritol triacrylate, dialkyl peroxide, benzophenone, (4-benzoylbenzyl) trimethylammonium chloride, or a combination of two or more thereof.

14. An electrochemical cell comprising the solid polymer electrolyte of claim 1.

15. The electrochemical cell according to claim 14, which comprises a metallic lithium anode.

16. A method for preparing a solid polymer electrolyte, the method comprising:
   a. providing a mixture comprising a metal ion conductive polymer system, a phosphonium salt, and a dissociable metal salt; and
   b. forming the mixture into a body, wherein the metal ion conductive polymer system and the phosphonium salt solubilize the dissociable metal salt;
   the dissociable metal salt, metal ion conductive polymer system, and phosphonium salt form a homogeneous structure;
   the phosphonium salt has the general formula $[PR_1R_2R_3R_4]X$, where each of $R_1$, $R_2$, $R_3$ and $R_4$ are independently selected from $C_1$ to $C_{12}$ hydrocarbons, which hydrocarbons may be optionally substituted by 1 to 5 heteroatoms selected from N, O, and S, and X is an anion;
   the phosphonium salt has a melting point below 80° C.; and
   the solid polymer electrolyte is solid at a temperature of 20° C.

17. The method of claim 16, wherein the metal ion conductive polymer system is a crosslinkable metal ion conductive polymer system and the method further comprises a step of crosslinking the metal ion conductive polymer system after forming the mixture into the body.

18. The method of claim 17, wherein the mixture further comprises a polymerization initiator.

19. The method according to claim 16, wherein the mixture is formed into the body by solvent casting or melt extrusion.

20. The method according to claim 17, wherein the step of crosslinking the crosslinkable conductive polymer comprises exposing the body to a UV source, exposing the body to an infrared source, or heating the body.

21. The method according to claim 16, wherein the body is a film.

* * * * *